US011054708B2

United States Patent
Iwasa

(10) Patent No.: US 11,054,708 B2
(45) Date of Patent: Jul. 6, 2021

(54) LIQUID CRYSTAL DEVICE, WAVELENGTH SELECTION OPTICAL SWITCH APPARATUS, AND PIXEL INSPECTION METHOD OF LIQUID CRYSTAL DEVICE

(71) Applicant: JVCKENWOOD CORPORATION, Yokohama (JP)

(72) Inventor: Takayuki Iwasa, Kanagawa (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/001,573

(22) Filed: Aug. 24, 2020

(65) Prior Publication Data

US 2021/0072608 A1 Mar. 11, 2021

(30) Foreign Application Priority Data

Sep. 5, 2019 (JP) .............................. JP2019-161911

(51) Int. Cl.
*G09G 3/36* (2006.01)
*G02F 1/1362* (2006.01)
*G02F 1/1368* (2006.01)
*G09G 3/00* (2006.01)

(52) U.S. Cl.
CPC ...... *G02F 1/136286* (2013.01); *G02F 1/1368* (2013.01); *G09G 3/006* (2013.01); *G09G 3/3614* (2013.01); *G09G 3/3688* (2013.01); *G02F 2201/121* (2013.01); *G02F 2201/123* (2013.01);
(Continued)

(58) Field of Classification Search
CPC .................. G09G 3/18; G09G 3/2003; G09G 3/3406–3426; G09G 3/36–3696; G09G 3/0439–0895; G09G 2300/0439–089; G09G 2310/0251–0275; G09G 2320/0204–0214;
(Continued)

(56) References Cited

U.S. PATENT DOCUMENTS

2006/0238460 A1* 10/2006 Huang ................. G09G 3/3275
345/76
2009/0219238 A1 9/2009 Furuya et al.
(Continued)

FOREIGN PATENT DOCUMENTS

JP 2009-223289 A 10/2009

*Primary Examiner* — Sanghyuk Park
(74) *Attorney, Agent, or Firm* — Procopio, Cory, Hargreaves & Savitch LLP

(57) ABSTRACT

A liquid crystal display apparatus includes a plurality of sense amplifiers configured to amplify respective potential differences between a plurality of positive-polarity pixel drive voltages read out from a plurality of pixels of a row to be inspected to a plurality of positive-polarity data lines and a plurality of negative-polarity pixel drive voltages read out from a plurality of pixels of a row to be inspected to a plurality of negative-polarity data lines, in which each of the pixels includes a first switch transistor configured to switch whether or not to output a positive-polarity pixel drive voltage before it is applied to a pixel drive electrode to a corresponding positive-polarity data line and a second switch transistor configured to switch whether or not to supply a negative-polarity pixel drive voltage before it is applied to the pixel drive electrode to a corresponding negative-polarity data line.

7 Claims, 12 Drawing Sheets

(52) U.S. Cl.
CPC ............... *G09G 2300/0823* (2013.01); *G09G 2300/0833* (2013.01)

(58) Field of Classification Search
CPC ........ G09G 2320/0285–0295; G09G 2340/16; G09G 2330/10
See application file for complete search history.

(56) References Cited

U.S. PATENT DOCUMENTS

2012/0200548 A1\* 8/2012 Iwasa .................... G09G 3/3648
345/208
2017/0229087 A1\* 8/2017 Xu ........................ G09G 3/3696

\* cited by examiner

LIQUID CRYSTAL DEVICE, WAVELENGTH SELECTION OPTICAL SWITCH APPARATUS, AND PIXEL INSPECTION METHOD OF LIQUID CRYSTAL DEVICE

CROSS REFERENCE TO RELATED APPLICATION

This application is based upon and claims the benefit of priority from Japanese patent application No. 2019-161911, filed on Sep. 5, 2019, the disclosure of which is incorporated herein in its entirety by reference.

BACKGROUND

The present disclosure relates to a liquid crystal device, a wavelength selection optical switch apparatus, and a pixel inspection method of the liquid crystal device, and relates to a liquid crystal device, a wavelength selection optical switch apparatus, and a pixel inspection method of the liquid crystal device suitable for quickly executing inspection of pixels.

A liquid crystal display apparatus disclosed in Japanese Unexamined Patent Application Publication No. 2009-223289 includes a plurality of pixels arranged in a matrix, a plurality of sets of data lines provided so as to correspond to respective columns of the plurality of pixels, a plurality of gate lines provided so as to correspond to respective rows of the plurality of pixels, a plurality of switches for supplying positive-polarity and negative-polarity video signals to a plurality of sets of data lines in order in a set unit, and driving means for driving the plurality of switches and the plurality of gate lines.

SUMMARY

Incidentally, it is required for the liquid crystal display apparatus to inspect pixels to determine, for example, whether or not there are defects or deterioration in characteristics before shipping of products in order to improve reliability.

Japanese Unexamined Patent Application Publication No. 2009-223289 does not disclose, however, a specific method of inspecting pixels. Therefore, in the liquid crystal display apparatus disclosed in Japanese Unexamined Patent Application Publication No. 2009-223289, for example, it is considered that a video signal (pixel drive voltage) written into the pixel to be inspected is read out using a path for writing the video signal into the pixel in the normal operation and the pixel is inspected based on the video signal that has been read out. In this inspection method, however, there is a problem that, since the video signal written into the pixel to be inspected cannot be quickly read out due to an influence of a large wiring capacity added to a propagation path of the video signal, it is impossible to quickly execute inspection of pixels.

A liquid crystal device according to one aspect of an embodiment includes: a plurality of pixels arranged in a matrix; a plurality of first data lines provided so as to correspond to respective columns of the plurality of pixels; a plurality of second data lines provided so as to correspond to respective columns of the plurality of pixels; a plurality of first switch elements configured to switch whether or not to supply a positive-polarity video signal to each of the plurality of first data lines and switch whether or not to supply a negative-polarity video signal to each of the plurality of second data lines; and a plurality of sense amplifiers configured to amplify potential differences between a plurality of positive-polarity pixel drive voltages read out from the plurality of pixels of a row to be inspected to the plurality of respective first data lines and a plurality of negative-polarity pixel drive voltages read out from the plurality of pixels of the row to be inspected to the plurality of respective second data lines and output resulting voltages as a plurality of detection signals, in which each of the pixels includes: a first sample and hold circuit configured to sample and hold the positive-polarity video signal supplied to the corresponding first data line; a second sample and hold circuit configured to sample and hold the negative-polarity video signal supplied to the corresponding second data line; a liquid crystal display element including a pixel drive electrode, a common electrode, and liquid crystal sealed therebetween; a polarity changeover switch configured to selectively apply the voltage of the positive-polarity video signal held by the first sample and hold circuit and the voltage of the negative-polarity video signal held by the second sample and hold circuit to the pixel drive electrode; a first switch transistor configured to switch whether or not to output the voltage of the positive-polarity video signal that has been output from the first sample and hold circuit and has not been applied to the pixel drive electrode via the polarity changeover switch to the corresponding first data line as the positive-polarity pixel drive voltage; and a second switch transistor configured to switch whether or not to output the voltage of the negative-polarity video signal that has been output from the second sample and hold circuit and has not been applied to the pixel drive electrode via the polarity changeover switch to the corresponding second data line as the negative-polarity pixel drive voltage.

A pixel inspection method of a liquid crystal device according to one aspect of an embodiment includes: a plurality of pixels arranged in a matrix; a plurality of first data lines provided so as to correspond to respective columns of the plurality of pixels; a plurality of second data lines provided so as to correspond to respective columns of the plurality of pixels; a plurality of first switch elements configured to switch whether or not to supply a positive-polarity video signal to each of the plurality of first data lines and switch whether or not to supply a negative-polarity video signal to each of the plurality of second data lines; and a plurality of sense amplifiers configured to amplify potential differences between a plurality of positive-polarity pixel drive voltages read out from the plurality of pixels of a row to be inspected to the plurality of respective first data lines and a plurality of negative-polarity pixel drive voltages read out from the plurality of pixels of the row to be inspected to the plurality of respective second data lines and output resulting voltages as a plurality of detection signals, in which each of the pixels includes: a first sample and hold circuit configured to sample and hold the positive-polarity video signal supplied to the corresponding first data line; a second sample and hold circuit configured to sample and hold the negative-polarity video signal supplied to the corresponding second data line; a liquid crystal display element including a pixel drive electrode, a common electrode, and liquid crystal sealed therebetween; a polarity changeover switch configured to selectively apply the voltage of the positive-polarity video signal held by the first sample and hold circuit and the voltage of the negative-polarity video signal held by the second sample and hold circuit to the pixel drive electrode; a first switch transistor configured to switch whether or not to output the voltage of the positive-polarity video signal that has been output from the first sample and hold circuit and has not been applied to the pixel drive electrode via the polarity changeover switch to the corresponding first data line as the positive-polarity pixel drive voltage; and a second switch transistor configured to switch whether or not to output the voltage of the negative-polarity video signal that has been output from the second sample and hold circuit and has not been applied to the pixel drive electrode via the polarity changeover switch to the corresponding second data line as the negative-polarity pixel drive voltage, the method including: turning on the plurality of first switch elements in a state in which the first and second switch transistors provided in each of the pixels is turned off, thereby supplying the positive-polarity video signal to each of the plurality of first data lines and supplying the negative-polarity video signal to each of the plurality of second data lines; writing the positive-polarity video signal from the plurality of respective first data lines to the plurality of pixels of the row to be inspected and writing the negative-polarity video signal from the plurality of respective second data lines to the plurality of pixels of the row to be inspected; turning on the first switch transistor provided in each of the pixels of the row to be inspected in a state in which the plurality of first switch elements are turned off, thereby reading out the plurality of positive-polarity pixel drive voltages from the plurality of pixels of the row to be inspected to the plurality of respective first data lines; turning on the second switch transistor provided in each of the pixels of the row to be inspected in a state in which the plurality of first switch elements are turned off, thereby reading out the plurality of negative-polarity pixel drive voltages from the plurality of pixels of the row to be inspected to the plurality of respective second data lines; amplifying respective potential differences between the plurality of positive-polarity pixel drive voltages read out from the plurality of pixels of the row to be inspected to the plurality of respective first data lines and the plurality of negative-polarity pixel drive voltages read out from the plurality of pixels of the row to be inspected to the plurality of respective second data lines using the plurality of sense amplifiers and outputting resulting voltages as a plurality of detection signals; and detecting whether or not there is a failure in the plurality of pixels of the row to be inspected based on the plurality of detection signals output from the plurality of respective sense amplifiers.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

<Study in Advance by Inventors>

Prior to giving a description of a liquid crystal display apparatus according to a first embodiment, contents studied in advance by the inventors will be described.
(Configuration of Liquid Crystal Display Apparatus 50 in Conceptual Stage)

Figure 1:
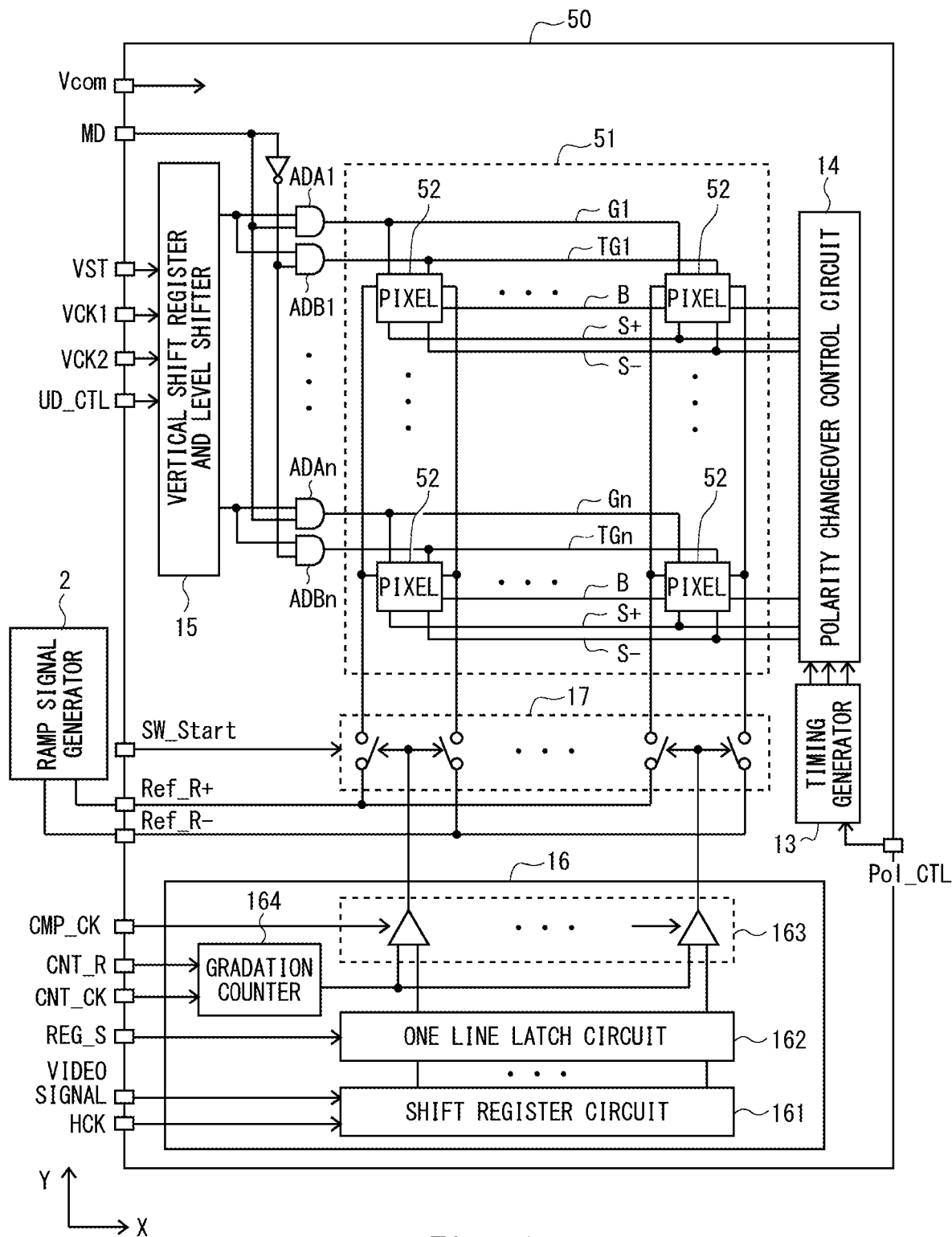
FIG. 1 is a diagram showing a configuration example of a liquid crystal display apparatus in a conceptual stage before arriving at an embodiment.

FIG. 1 is a diagram showing a configuration example of an active matrix type liquid crystal display apparatus (liquid crystal device) 50 in a conceptual stage.

As shown in FIG. 1, the liquid crystal display apparatus 50 includes an image display unit 51, a timing generator 13, a polarity changeover control circuit 14, a vertical shift register and level shifter 15, a horizontal driver 16, an analog switch unit 17, and AND circuits ADA1 to ADAn and ADB1 to ADBn. The horizontal driver 16, which composes a data line drive circuit together with the analog switch unit 17, includes a shift register circuit 161, one line latch circuit 162, a comparator unit 163, and a gradation counter 164. FIG. 1 also shows a ramp signal generator 2 connected to the liquid crystal display apparatus 50 in a normal operation.

Figure 2:
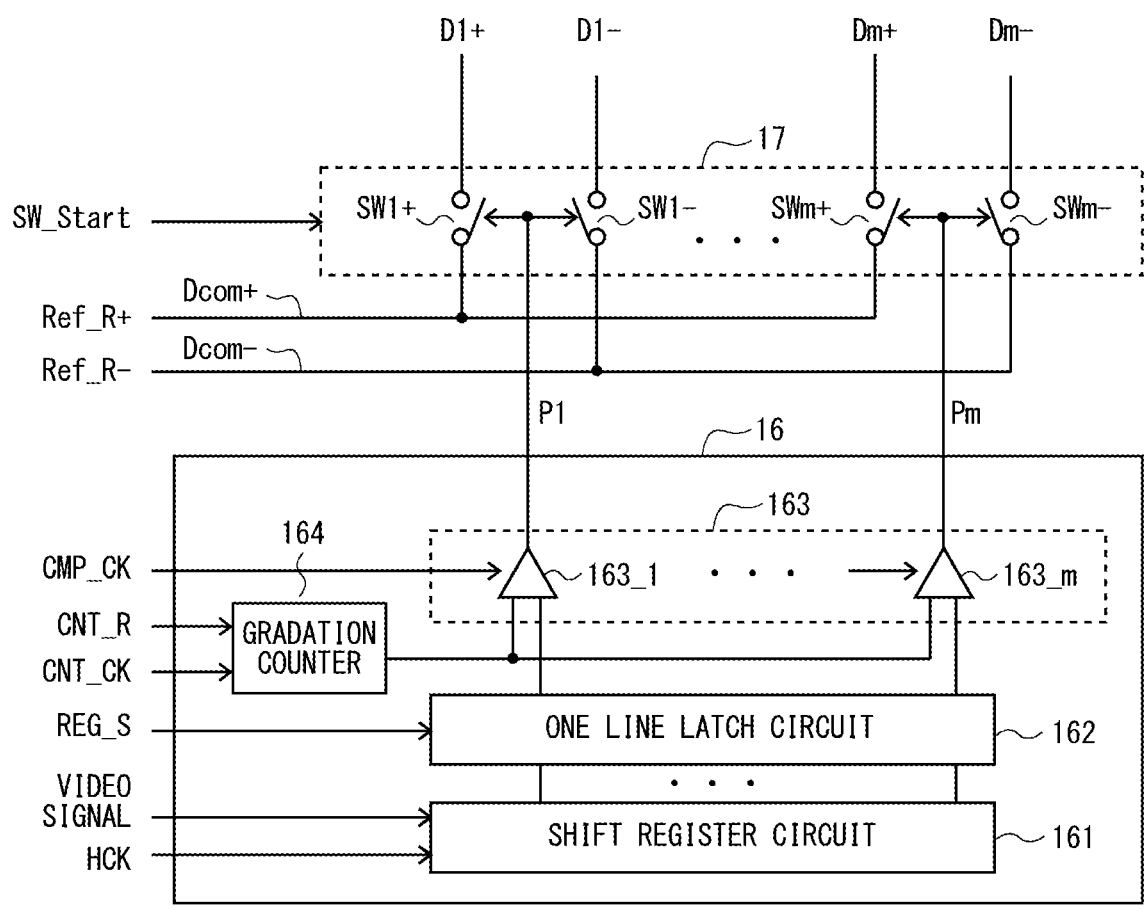
FIG. 2 is a diagram showing a horizontal driver 16 and an analog switch unit 17 provided in the liquid crystal display apparatus shown in FIG. 1 in more detail.

FIG. 2 is a diagram showing the horizontal driver 16 and the analog switch unit 17 provided in the liquid crystal display apparatus 50 in more detail. The comparator unit 163 includes m (m is an integer equal to or larger than two) comparators 163_1 to 163_m that correspond to pixels 52 of m columns. The analog switch unit 17 includes m sets of switch elements SW1+, SW1− to SWm+, and SWm− that correspond to pixels 52 of m columns.

In the pixel region of the image display unit 51, row scan lines G1 to Gn of n (n is an integer equal to or larger than two) rows and switch selection lines for reading TG1 to TGn of n rows extending in a horizontal direction (an X-axis direction), and a set of data lines D1+, D1− to Dm+, and Dm− of m columns extending in a vertical direction (a Y-axis direction) are aligned. Further, in the pixel region of the image display unit 51, gate control signal lines S+ and S−, and a gate control signal line B are aligned.

The image display unit 51 includes a plurality of pixels 52 that are regularly arranged. The plurality of pixels 52 are arranged in a two-dimensional matrix form at a total of n×m intersection parts in which the row scan lines G1 to Gn of n rows extending in the horizontal direction (the X-axis direction) intersect with the m sets of data lines D1+, D1− to Dm+, and Dm− extending in the vertical direction (the Y-axis direction).

A row scan line Gj (j is any integer from 1 to n) and a switch selection line for reading TGj are connected in common to each of m pixels 52 arranged in the j-th row. Further, the data lines Di+ and Di− (i is any integer from 1 to m) are connected in common to each of n pixels 52 arranged in the i-th column. Further, each of the gate control signal lines S+ and S− and the gate control signal line B is connected in common to all the pixels 52. Alternatively, each of the gate control signal lines S+ and S− and the gate control signal line B may be provided separately for each row.

The polarity changeover control circuit 14 outputs, based on a timing signal generated by the timing generator 13, a gate control signal for the positive polarity (hereinafter this signal is referred to as a gate control signal S+) to the gate control signal line S+, outputs a gate control signal for the negative polarity (hereinafter this signal is referred to as a gate control signal S−) to the gate control signal line S−, and further outputs a gate control signal (hereinafter this signal is referred to as a gate control signal B) to the gate control signal line B.

The vertical shift register and level shifter 15 outputs scan pulses of n rows from the first row to the n-th row one row at a time in series in a cycle of one horizontal scan period HST. The AND circuits ADA1 to ADAn respectively control, based on a mode switch signal MD externally supplied, whether or not to output the scan pulses of n rows sequentially output from the vertical shift register and level shifter 15 one row at a time to the row scan lines G1 to Gn. The AND circuits ADB1 to ADBn respectively control, based on the mode switch signal MD externally supplied, whether or not to output the scan pulses of n rows sequentially output from the vertical shift register and level shifter 15 one row at a time to the switch selection lines for reading TG1 to TGn.

For example, in a case of an operation in which a video signal is written into the pixel 52 (image writing operation), an H level mode switch signal MD is externally supplied. In this case, the AND circuits ADA1 to ADAn respectively output the scan pulses of n rows sequentially output from the vertical shift register and level shifter 15 one row at a time to the row scan lines G1 to Gn. On the other hand, the AND circuits ADB1 to ADBn do not respectively output the scan pulses of n rows sequentially output from the vertical shift register and level shifter 15 one row at a time to the switch selection lines for reading TG1 to TGn. Therefore, each of the switch selection lines for reading TG1 to TGn is fixed to the L level.

On the other hand, when the video signal written into the pixel 52 is read out (image reading operation), an L level mode switch signal MD is externally supplied. In this case, the AND circuits ADB1 to ADBn respectively output the scan pulses of n rows sequentially output from the vertical shift register and level shifter 15 one row at a time to the switch selection lines for reading TG1 to TGn. On the other hand, the AND circuits ADA1 to ADAn do not respectively output the scan pulses of n rows sequentially output from the vertical shift register and level shifter 15 one row at a time to the row scan lines G1 to Gn. Therefore, each of the row scan lines G1 to Gn is fixed to the L level.

(Specific Configuration Example of Pixel 52)

Figure 3:
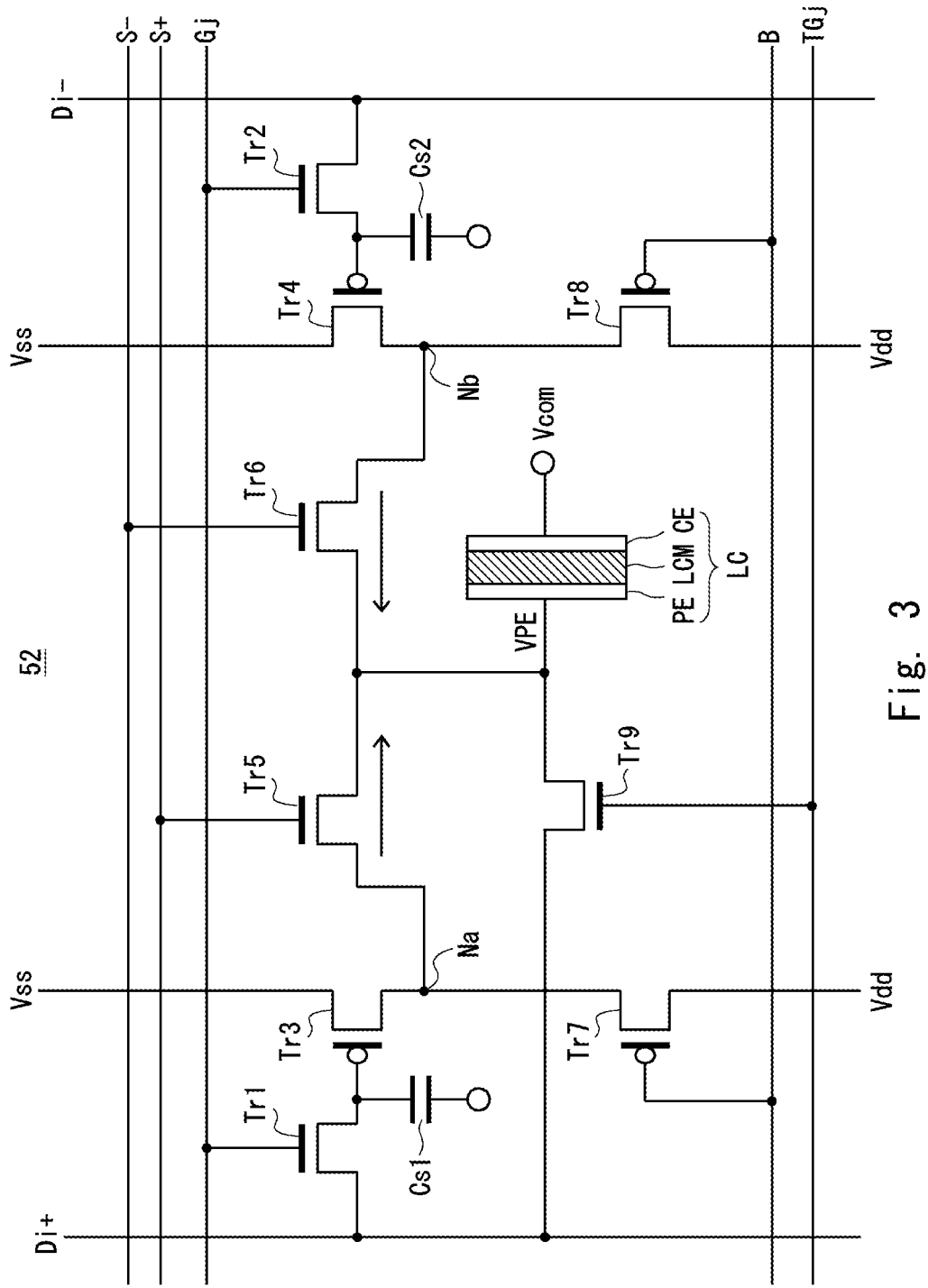
FIG. 3 is a diagram showing a specific configuration example of a pixel provided in the liquid crystal display apparatus shown in FIG. 1.

FIG. 3 is a diagram showing a specific configuration example of the pixel 52. In this example, of pixels 52 of n rows×m columns, the pixel 52 provided in the j-th row and the i-th column will be described.

As shown in FIG. 3, the pixel 52 includes N channel MOS transistors (hereinafter they are simply referred to as transistors) Tr1, Tr2, Tr5, Tr6, and Tr9 and P channel MOS transistors (hereinafter they are simply referred to as transistors) Tr3, Tr4, Tr7, and Tr8.

The transistor Tr1 and a holding capacitor Cs1 compose a sample and hold circuit configured to sample and hold the positive-polarity video signal supplied via the data line Di+. Specifically, in the transistor Tr1, the source is connected to one data line Di+ of the data line pair, the drain is connected to the gate of the transistor Tr3, and the gate is connected to the row scan line Gj. The holding capacitor Cs1 is provided between the gate of the transistor Tr3 and a ground voltage terminal Vss.

The transistor Tr2 and a holding capacitor Cs2 compose a sample and hold circuit configured to sample and hold the negative-polarity video signal supplied via the data line Di−. Specifically, in the transistor Tr2, the source is connected to the other data line Di− of the data line pair, the drain is connected to the gate of the transistor Tr4, and the gate is connected to the row scan line Gj. The holding capacitor Cs2 is provided between the gate of the transistor Tr3 and the ground voltage terminal Vss. Note that the holding capacitors Cs1 and Cs2 are provided independently from each other and respectively hold the positive-polarity and negative-polarity video signals in parallel.

The transistors Tr3 and Tr7 compose a source follower buffer (buffer for impedance conversion) that outputs a voltage held in the holding capacitor Cs1. Specifically, in the transistor Tr3 of the source follower, the drain is connected to the ground voltage line Vss and the source is connected to a node Na. In the transistor Tr7 used as a constant current load in which bias control is possible, the source is connected to a power supply voltage line Vdd, the drain is connected to the node Na, and the gate is connected to the gate control signal line B.

The transistors Tr4 and Tr8 compose a source follower buffer that outputs the voltage held in the holding capacitor Cs2. Specifically, in the transistor Tr4 of the source follower, the drain is connected to the ground voltage line Vss and the source is connected to a node Nb. In the transistor Tr8 used as a constant current load in which bias control is possible, the source is connected to the power supply voltage line Vdd, the drain is connected to the node Nb, and the gate is connected to the gate control signal line B.

The transistors Tr5 and Tr6 compose a polarity changeover switch. Specifically, in the transistor Tr5, the source is connected to the node Na, the drain is connected to a pixel drive electrode PE, and the gate is connected to one gate control signal line S+ of a pair of gate control signal lines. In the transistor Tr6, the source is connected to the node Nb, the drain is connected to the pixel drive electrode PE, and the gate is connected to the other gate control signal line S− of the pair of gate control signal lines.

A liquid crystal display element LC includes a pixel drive electrode (reflecting electrode) PE having light reflectivity, a common electrode CE having light transmissivity, the common electrode CE being disposed facing apart from the pixel drive electrode, and liquid crystal LCM filled and sealed in a spatial area between them. A common voltage Vcom is applied to the common electrode CE. The transistor Tr9 is provided between the pixel drive electrode PE and the data line Di+ and is switched to be on or off by the switch selection line for reading TGj.

Video signals which are sampled by the analog switch unit 17 and have polarities different from each other are supplied to the data line pair Di+ and Di−. When the scan pulse output from the vertical shift register and level shifter 15 is supplied to the row scan line Gj, the transistors Tr1 and Tr2 are concurrently turned on. Accordingly, the voltages of the positive-polarity and negative-polarity video signals are respectively accumulated and held in the holding capacitors Cs1 and Cs2.

Note that the input resistance of the positive-side source follower buffer and that of the negative-side source follower buffer are almost infinite. Therefore, the charge accumulated in the holding capacitor Cs1 and that accumulated in the holding capacitor Cs2 are not leaked and held until a new video signal is written after one vertical scan period is passed.

The transistors Tr5 and Tr6 that compose a polarity changeover switch switch ON/OFF in accordance with the gate control signals S+ and S−, thereby alternately selecting the output voltage of the positive-side source follower buffer (the voltage of the positive-polarity video signal) and the output voltage of the negative-side source follower buffer (the voltage of the negative-polarity video signal) to output the selected voltage to the pixel drive electrode PE. Accordingly, the voltage of the video signal whose polarity is periodically inverted is applied to the pixel drive electrode PE. In this way, in this liquid crystal display apparatus, the pixels themselves have a polarity inversion function. Therefore, by switching the polarity of the voltage of the video signal supplied to the pixel drive electrode PE at a high speed in each pixel, it is possible to perform AC drive at a high frequency regardless of the vertical scan frequency.

(Description of AC Drive Method of Pixel 52)

Figure 4:
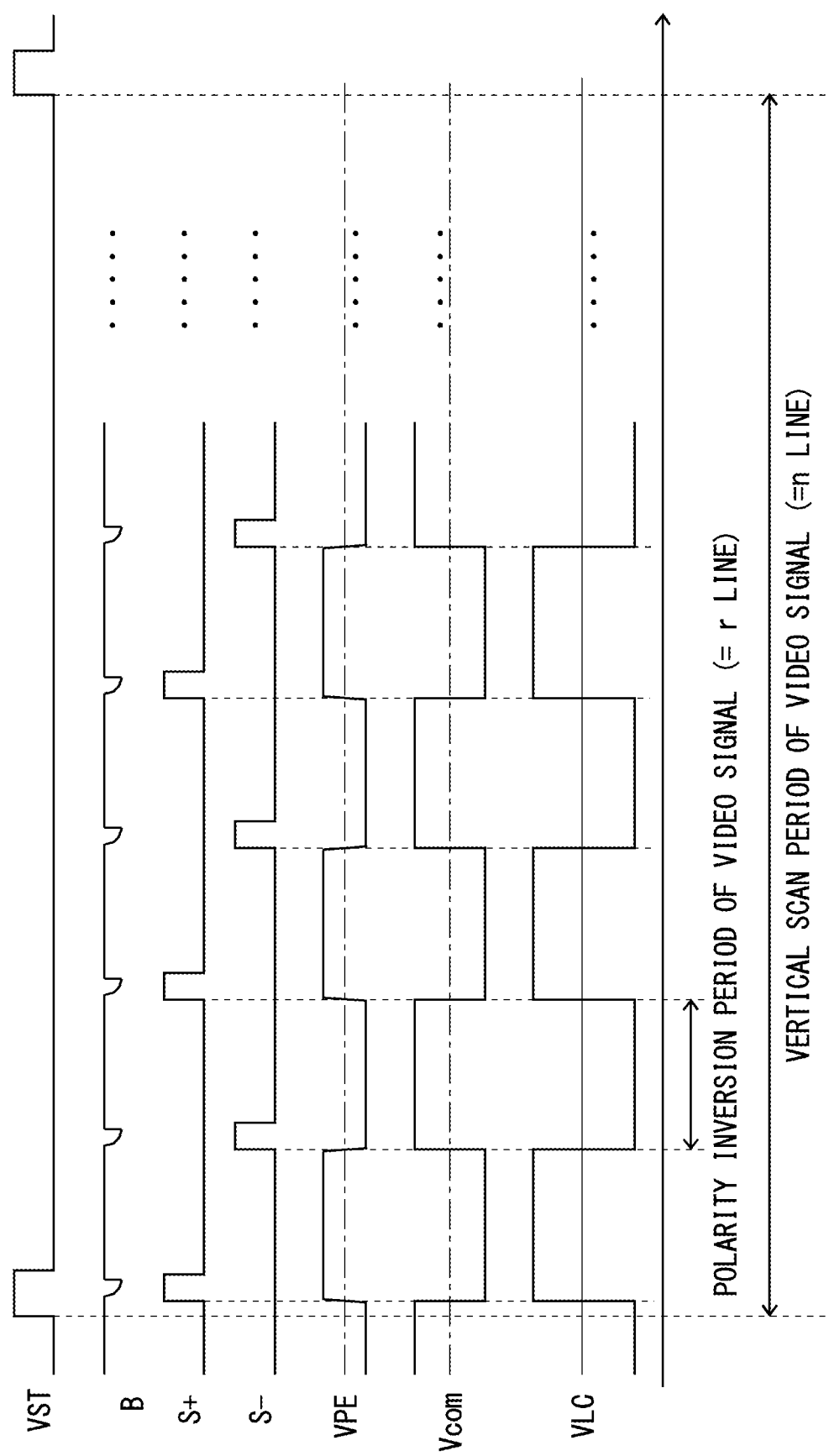
FIG. 4 is a timing chart for explaining a method of driving pixels by the liquid crystal display apparatus shown in FIG. 1.

FIG. 4 is a timing chart for describing an AC drive method of the pixel 52 by the liquid crystal display apparatus 50. In this example, the AC drive method of the pixel 52 provided in the j-th row and the i-th column of the pixels 52 of n rows×m columns will be described.

In FIG. 4, VST indicates a vertical synchronization signal, which is a reference for vertical scan of a video signal. The symbol B indicates a gate control signal to be supplied to each of the gates of the transistors Tr7 and Tr8 used as a constant current load of the source follower buffers of two types. The symbol S+ indicates a gate control signal to be supplied to the gate of the positive-side transistor Tr5 provided in the polarity changeover switch. The symbol S-indicates a gate control signal to be supplied to the gate of the negative-side transistor Tr6 provided in the polarity changeover switch. The symbol VPE indicates a voltage to be applied to the pixel drive electrode PE. The symbol Vcom indicates a voltage to be applied to the common electrode CE. The symbol VLC indicates an AC voltage to be applied to the liquid crystal LCM.

Figure 5:
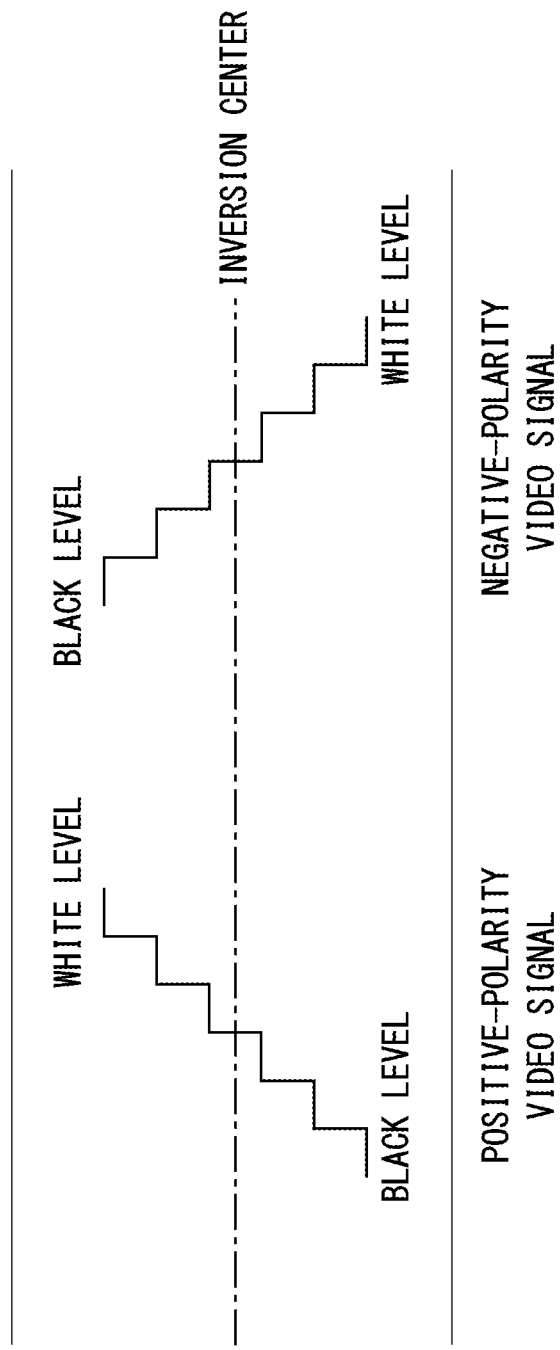
FIG. 5 is a diagram for illustrating a voltage level from black to white of each of a positive-polarity video signal and a negative-polarity video signal written into a pixel.

Further, FIG. 5 is a diagram for illustrating the voltage level from black to white of each of the positive-polarity video signal and the negative-polarity video signal written into the pixel 52. In the example of FIG. 5, the positive-polarity video signal indicates the black level when the voltage level is a minimum and indicates the white level when the voltage level is a maximum. On the other hand, the negative-polarity video signal indicates the white level when the voltage level is a minimum and indicates the black level when the voltage level is a maximum. Alternatively, the positive-polarity video signal may indicate the white level when the voltage level is a minimum and indicate the black level when the voltage level is a maximum. Further, the negative-polarity video signal may indicate the black level when the voltage level is a minimum and indicate the white level when the voltage level is a maximum. The alternate long and short dash line shown in FIG. 5 indicates the inversion center of the positive-polarity video signal and the negative-polarity video signal.

In the pixel 52, the transistor Tr9 maintains the off state when the switch selection line for reading TGj is fixed to the L level. On the other hand, the transistors Tr1 and Tr2 are temporarily turned on when the scan pulse is supplied to the row scan line Gj. When the transistors Tr1 and Tr2 are turned on, the voltages of the positive-polarity and negative-polarity video signals are accumulated and held in the holding capacitors Cs1 and Cs2, respectively.

As shown in FIG. 4, the positive-side transistor Tr5 is turned on in a period in which the gate control signal S+ indicates the H level. At this time, the gate control signal B is set to the L level, which causes the transistor Tr7 to be turned on, whereby the positive-side source follower buffer becomes active. Accordingly, the pixel drive electrode PE is charged to the voltage level of the positive-polarity video signal. Since the gate control signal B is set to the L level, the transistor Tr8 is turned on, whereby the negative-side source follower buffer becomes active. However, since the negative-side transistor Tr6 has been turned off, the pixel drive electrode PE is not charged to the voltage level of the negative-polarity video signal. At a timing when the pixel drive electrode PE is fully charged, the gate control signal B is switched from the L level to the H level and the gate control signal S+ is switched from the H level to the L level. Accordingly, the pixel drive electrode PE is in the floating state, whereby a positive-polarity drive voltage is held in a liquid crystal capacitor.

On the other hand, the negative-side transistor Tr6 is turned on in a period in which the gate control signal S− indicates the H level. At this time, the gate control signal B is set to the L level, which causes the negative-side transistor Tr8 to be turned on, whereby the negative-side source follower buffer becomes active. Accordingly, the pixel drive electrode PE is charged to the voltage level of the negative-polarity video signal. Since the gate control signal B is set to the L level, the transistor Tr7 is turned on, which causes the positive-side source follower buffer to become active as well. However, since the positive-side transistor Tr5 has been turned off, the pixel drive electrode PE is not charged to the voltage level of the positive-polarity video signal. At a timing when the pixel drive electrode PE is fully charged, the gate control signal B is switched from the L level to the H level and the gate control signal S− is switched from the H level to the L level. Accordingly, since the pixel drive electrode PE is in the floating state, a negative-polarity drive voltage is held in the liquid crystal capacitor.

By alternately repeating the aforementioned operation on the positive side and operation on the negative side, the drive voltage VPE, which is made to be AC using the voltage of the positive-polarity video signal and the voltage of the negative-polarity video signal, is applied to the pixel drive electrode PE.

Since the charge held in the holding capacitors Cs1 and Cs2 is not directly transmitted to the pixel drive electrode PE and it is transmitted to the pixel drive electrode PE via the source follower buffer, even when charging and discharging of the voltages of the positive-polarity and negative-polarity video signals are repeatedly performed in the pixel drive electrode PE, it is possible to achieve pixel drive in which the voltage level does not attenuate without neutralizing the charge.

Further, as shown in FIG. 4, the voltage level of the voltage Vcom applied to the common electrode CE is switched to the level opposite to the applied voltage VPE in synchronization with the switching of the voltage level of the voltage VPE applied to the pixel drive electrode PE. The voltage Vcom applied to the common electrode CE uses a voltage which is approximately equal to an inversion reference voltage of the voltage VPE applied to the pixel drive electrode PE as an inversion reference.

Since a substantial AC voltage VLC applied to the liquid crystal LCM is a differential voltage between the voltage VPE applied to the pixel drive electrode PE and the voltage Vcom applied to the common electrode CE, an AC voltage VLC that does not include DC components is applied to the liquid crystal LCM. In this way, by switching the voltage Vcom applied to the common electrode CE in a reverse phase with respect to the voltage VPE applied to the pixel drive electrode PE, the amplitude of the voltage to be applied to the pixel drive electrode PE can be made small, whereby it is possible to reduce the breakdown voltage and power consumption of the transistors that compose a circuit part of the pixel.

Even if the current that constantly flows through the source follower buffer per pixel is a small current of 1 µA, it is possible that the current that constantly flows through all the pixels of the liquid crystal display apparatus may be too large to ignore. In a liquid crystal display apparatus having two million pixels for the full high vision, for example, it is possible that the consumed current may reach 2 A. In order to avoid this situation, in the pixels 52, the transistors Tr7 and Tr8 used as a constant current load are not always set to the ON state. Instead, the transistors Tr7 and Tr8 are set to the ON state only in a limited period within the period in which the positive-side transistor Tr5 or the negative-side transistor Tr6 is in the ON state. Accordingly, in the case in which one source follower buffer is operated, the operation of the other source follower buffer can be stopped, whereby it is possible to prevent the consumed current from being increased.

The AC drive frequency of the liquid crystal display element LC does not depend on the vertical scan frequency and can be set freely by adjusting an inversion control period of the pixel itself. For example, the vertical scan frequency is assumed to be 60 Hz, which is used for a typical TV video signal, and the number of vertical period scan lines n for the full high vision is 1125 lines. It is further assumed that the polarity changeover in each pixel is performed in a cycle of about 15 lines. In other words, it is assumed that the number of lines r for each cycle of the polarity changeover in each pixel is 30 lines. In this case, the AC drive frequency of the liquid crystal becomes 60 Hz×1125/(15×2)=2.25 kHz. That is, the liquid crystal display apparatus 50 is able to dramatically increase the AC drive frequency of the liquid crystal. Accordingly, it is possible to dramatically improve reliability, safety, and display quality of the video images displayed on a liquid crystal screen which are poor in the case in which the AC drive frequency of the liquid crystal is low.

Next, an operation of the liquid crystal display apparatus 50 in each operation mode will be described.
(Operation of Liquid Crystal Display Apparatus 50 in Image Display Mode)

Figure 6:
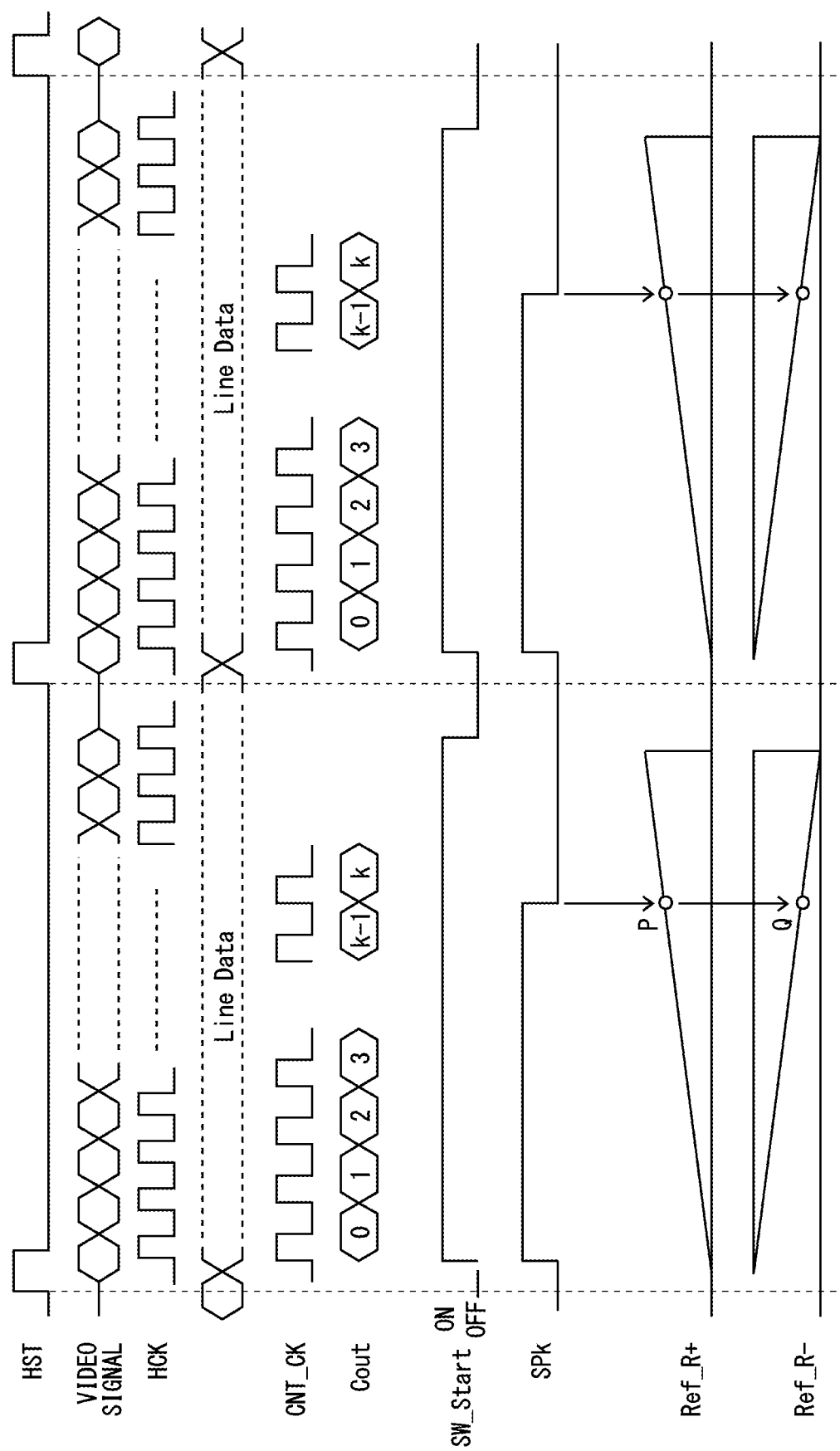
FIG. 6 is a timing chart showing an operation of the liquid crystal display apparatus shown in FIG. 1 in an image display mode.

First, with reference to FIG. 6, an operation of the liquid crystal display apparatus 50 in an image display mode will be described. FIG. 6 is a timing chart showing the operation of the liquid crystal display apparatus 50 in the image display mode.

As shown in FIG. 6, when a pulse signal of a horizontal synchronization signal HST is supplied, the shift register circuit 161 sequentially takes in video signals having an N (N is an integer equal to or larger than two)-bit width for m columns in synchronization with a clock signal HCK. The one line latch circuit 162 concurrently outputs the video signals for m columns taken by the shift register circuit 161 at a timing when the trigger signal REG_S temporarily becomes active.

The gradation counter 164 counts the number of times of rising of a clock signal CNT_CK and outputs a gradation signal Cout of the gradation level in accordance with the count value. The gradation counter 164 outputs the gradation signal Cout of the minimum level when one horizontal scan period is started (when the horizontal synchronization signal HST is raised), increases the gradation level of the gradation signal Cout in accordance with the increase in the count value, and outputs the gradation signal Cout at the maximum level when one horizontal scan period is ended (just before the next rising of the horizontal synchronization signal HST). Note that the count value by the gradation counter 164 is initialized to "0" when, for example, the reset signal CNT_R becomes active in accordance with the rising of the horizontal synchronization signal HST.

The comparators 163_1 to 163_m of m columns provided in the comparator unit 163 are operated in synchronization with a clock signal CMP_CK, and make the coincidence signals P1 to Pm active (e.g., the L level) at a timing when the gradation signal Cout output from the gradation counter 164 coincides with each of the video signals (line data) of m columns concurrently output from the one line latch circuit 162.

The positive-side switch elements SW1+ to SWm+ of the m sets of switch elements SW1+, SW1− to SWm+, and SWm− provided in the analog switch unit 17 are respectively provided between the data lines D1+ to Dm+ and a common wiring Dcom+. Further, the negative-side switch elements SW1− to SWm− are respectively provided between the data lines D1− to Dm− and a common wiring Dcom−. The m sets of switch elements SW1+, SW1− to SWm+, and SWm− switch ON and OFF by the coincidence signals P1 to Pm from the comparators 163_1 to 163_m.

A reference ramp voltage Ref_R+, which is a ramp signal for the positive polarity output from the ramp signal generator 2, is supplied to the common wiring Dcom+. Further, a reference ramp voltage Ref_R−, which is a ramp signal for the negative polarity output from the ramp signal generator 2, is supplied to the common wiring Dcom−.

The reference ramp voltage Ref_R+ is a sweeping signal whose video image level changes from the black level to the white level from the start to the end of each horizontal scan period. The reference ramp voltage Ref_R− is a sweeping signal whose video image level changes from the white level to the black level from the start to the end of each horizontal scan period. Therefore, the reference ramp voltage Ref_R+ with respect to the common voltage Vcom and the reference ramp voltage Ref_R− with respect to the common voltage Vcom are inverted relative to each other.

The switch elements SW1+, SW1− to SWm+, and SWm− are concurrently turned on since a start signal SW_Start becomes active (e.g., the H level) when the horizontal scan period is started. After that, the switch elements SW1+, SW1− to SWm+, and SWm− are switched from ON to OFF since the coincidence signals P1 to Pm respectively output from the comparators 163_1 to 163_m become active (e.g., the L level). When the horizontal scan period is ended, the start signal SW_Start becomes inactive (e.g., the L level).

In the example shown in FIG. 6, a waveform indicating the timing of switching ON and OFF of the switch elements SWq+ and SWq− (q is any integer from 1 to m) provided so as to correspond to the pixel column into which the video signal of the gradation level k is written is indicated as a waveform SPk. With reference to FIG. 6, after the above switch elements SWq+ and SWq− are turned on since the start signal SW_Start is raised, the switch elements SWq+ and SWq− are switched from ON to OFF when the coincidence signal Pq becomes active. The switch elements SWq+ and SWq− sample the reference ramp voltages Ref_R+ and Ref_R− (voltages P and Q in FIG. 6) at the timing when they are switched from ON to OFF. These sampled voltages P and Q are supplied to the data lines Dq+ and Dq−. In other words, analog voltages P and Q, which are the results of DA conversion of the video signal of the gradation level k, are respectively supplied to the data lines Dq+ and Dq−.

In the image display mode, an H level mode switch signal MD is externally supplied. Therefore, scan pulses of n rows sequentially output from the vertical shift register and level shifter 15 one row at a time are respectively supplied to the n row scan lines G1 to Gn. Accordingly, for example, the transistors Tr1 and Tr2 provided in each of the pixels 52 in the j-th row are temporarily turned on. As a result, in the holding capacitors Cs1 and Cs2 provided in each of the pixels 52 in the j-th row, the voltages of the corresponding positive-polarity and negative-polarity video signals are accumulated and held. On the other hand, the transistor Tr9 provided in each of the pixels 52 maintains the off state. The following AC drive method of each of the pixels 52 has already been described above.

As described above, while the switch elements SW1+, SW1− to SWm+, and SWm− are concurrently turned on when each horizontal scan period is started, each of them is turned off at an arbitrary timing in accordance with the gradation level of the image displayed on the corresponding pixel 52. That is, all the switch elements SW1+, SW1− to SWm+, and SWm− may be concurrently turned off or they may be turned off at timings different from one another. The order in which they are turned off is not fixed.

As described above, the liquid crystal display apparatus 50 DA converts the video signal using a ramp signal and writes the obtained signal into the pixel 52, whereby it is possible to improve linearity of images.

(Operation of Liquid Crystal Display Apparatus 50 in Pixel Inspection Mode)

Next, an operation of the liquid crystal display apparatus 50 in the pixel inspection mode will be described. Note that an inspection apparatus (not shown) is provided in place of the ramp signal generator 2 in the pixel inspection mode.

In the pixel inspection mode, first, the video signal for inspection is written into m pixels 52 in the j-th row to be inspected. The operation in this case is basically similar to that in the pixel display mode. After that, the video signal (pixel drive voltage VPE) written into m pixels 52 in the j-th row to be inspected is read out.

In the pixel reading operation, the mode switch signal MD externally supplied is switched from the H level to the L level. Therefore, the scan pulse in the j-th row output from the vertical shift register and level shifter 15 is supplied to the switch selection line for reading TGj. Accordingly, the transistor Tr9 provided in each of the terminals 52 in the j-th row to be inspected is temporarily turned on. On the other hand, the transistors Tr1 and Tr2 provided in each of the pixels 52 maintain the off state.

For example, in the pixel 52 provided in the j-th row and the i-th column, the transistor Tr9 is turned on, whereby the pixel drive electrode PE and the data line Di+ are made conductive. At this time, the transistors Tr7 and Tr8 are made active and one of the transistors Tr5 and Tr6 is turned on, whereby the pixel drive electrode PE is in the state in which it is driven by the source follower buffer composed of the transistors Tr3 and Tr7 or the transistors Tr4 and Tr8.

Accordingly, the drive voltage VPE applied to the pixel drive electrode PE by the source follower buffer is read out to the data line Di+.

The m pixel drive voltages VPE read out from the m pixels 52 in the j-th row to be inspected to each of the data lines D1+ to Dm+ sequentially turn on the m sets of SW1+, SW1− to SWm+, and SWm− provided in the analog switch unit 17, whereby they are sequentially supplied to the common wiring Dcom+. An inspection apparatus (not shown) provided in place of the ramp signal generator 2 detects whether or not there is a failure (pixel defects and deterioration in characteristics) in the m pixels 52 in the j-th row based on the m pixel drive voltages VPE sequentially supplied via the common wiring Dcom+.

The above inspection is performed in series from the m pixels 52 in the first row to the m pixels 52 in the n-th row, one row at a time.

In the pixel 52 to be inspected, the voltage VPE of the pixel drive electrode PE driven by the source follower buffer having a low output impedance is directly read out, whereby it is possible to detect defects or deterioration in characteristics of the pixel 52 to be inspected accurately and easily.

However, the pixel drive voltage VPE read out from the pixel 52 to be inspected is output to an external inspection apparatus via the data line Di+, the switch element SWi+, and the common wiring Dcom+. Therefore, the source follower buffer of the pixel 52 to be inspected needs to drive wiring having a large load capacity and a large resistance.

Specifically, the wiring capacity of the pixels 52 of n rows is added to the data line Di+. In the case of Full High Definition (FHD), for example, the wiring capacity of 1080 pixels (e.g., 1 pF) is added to the data line Di+. Further, the wiring capacity of 5 pF is, for example, added to the common wiring Dcom+. Therefore, the source follower buffer of the pixel 52 to be inspected needs to perform charging of a load capacity as high as 6 pF in total over a long period of time in order to stabilize the pixel drive voltage VPE to a level substantially equal to the voltage held in one of the holding capacitors Cs1 and Cs2. Further, in the pixel inspection mode, the pixel drive voltages VPE of all the respective pixels 52 are read out in serial, which causes the inspection time by the inspection apparatus to become extremely long. That is, in the liquid crystal display apparatus 50, there is a problem that the inspection of the pixels 52 by the inspection apparatus cannot be quickly executed. A prolonged inspection time causes an increase in the cost for the inspection.

If the pixels 52 to be inspected are inspected without waiting for the pixel drive voltage VPE to stabilize in order to reduce the inspection time, the inspection apparatus cannot accurately detect defects and the deterioration in characteristics of the pixels 52 to be inspected. In this case, for example, the pixel defects can be specified only after the entire image is displayed on the image display unit 51. Therefore, the number of steps required for the assembly of liquid crystal and projection evaluation increases, which causes the cost to increase.

In order to solve the aforementioned problem, a liquid crystal display apparatus and an inspection method thereof according to a first embodiment capable of executing inspection of pixels quickly have been found.

<First Embodiment>

Figure 7:
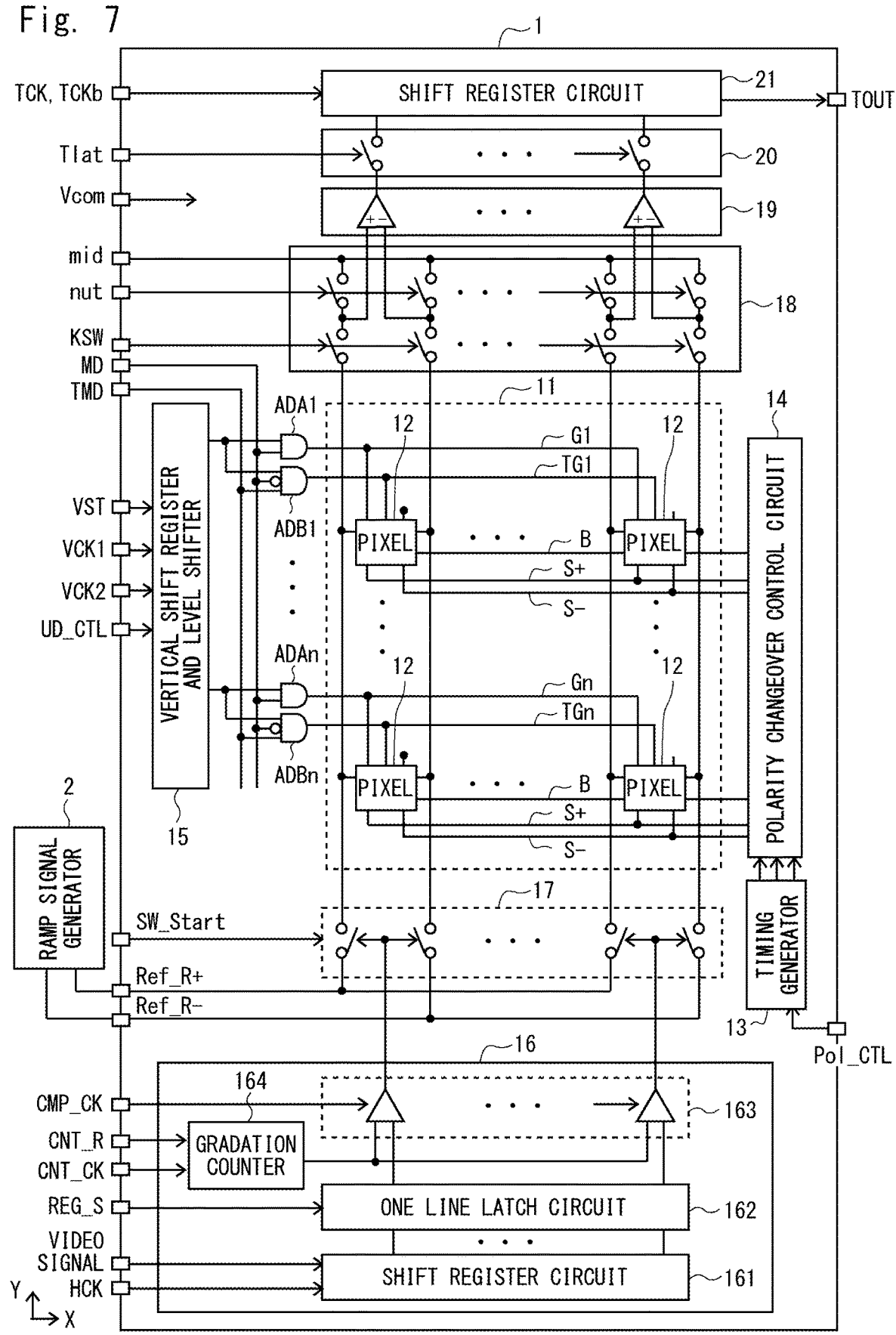
FIG. 7 is a diagram showing a configuration example of the liquid crystal display apparatus according to a first embodiment.

FIG. 7 is a diagram showing a configuration example of a liquid crystal display apparatus (liquid crystal device) 1 according to a first embodiment. The liquid crystal display apparatus 1 is different from the liquid crystal display apparatus 50 in that the liquid crystal display apparatus 1 includes, besides a path for writing the video signal into the pixel 12, a path for reading out the video signal from the pixel 12.

Specifically, the liquid crystal display apparatus 1 is different from the liquid crystal display apparatus 50 in that the liquid crystal display apparatus 1 includes an image display unit 11 in place of the image display unit 51 and further includes a switch unit 18, a sense amplifier unit 19, a latch unit 20, and a shift register circuit 21. FIG. 7 also shows a ramp signal generator 2 connected to the liquid crystal display apparatus 1 in the normal operation.

A horizontal driver 16, which composes a data line drive circuit together with an analog switch unit 17, includes a shift register circuit 161, a one line latch circuit 162, a comparator unit 163, and a gradation counter 164. The comparator unit 163 includes m (m is an integer equal to or larger than two) comparators 163_1 to 163_m that correspond to the pixels 12 of m columns. The analog switch unit 17 includes m sets of switch elements SW1+, SW1− to SWm+, and SWm− that correspond to the pixels 12 of m columns.

In the pixel region of the image display unit 11, row scan lines G1 to Gn of n rows (n is an integer equal to or larger than two) extending in the horizontal direction (the X-axis direction) and switch selection lines for reading TG1 to TGn of n rows are arranged. Further, in the pixel region of the image display unit 11, a set of data lines D1+, D1− to Dm+, and Dm− of m columns extending in the vertical direction (the Y-axis direction) are arranged. Further, gate control signal lines S+ and S− and a gate control signal line B are arranged in the pixel region of the image display unit 11.

The image display unit 11 includes a plurality of pixels 12 that are regularly arranged. The plurality of pixels 12 are arranged in a two-dimensional matrix form at a total n×m intersection parts in which the row scan lines G1 to Gn of n rows extending in the horizontal direction (the X-axis direction) intersect with the m sets of data lines D1+, D1− to Dm+, and Dm− extending in the vertical direction (the Y-axis direction).

The row scan line Gj and the switch selection line for reading TGj are connected in common to each of the m pixels 12 arranged in the j-th row. Further, the data lines Di+ and Di− are connected in common to each of the n pixels 12 arranged in the i-th column. Further, both the gate control signal lines S+ and S− and the gate control signal line B are connected in common to all the pixels 12. Alternatively, each of the gate control signal lines S+ and S− and the gate control signal line B may be provided separately for each row.

(Specific Configuration Example of Pixel 12)

Figure 8:
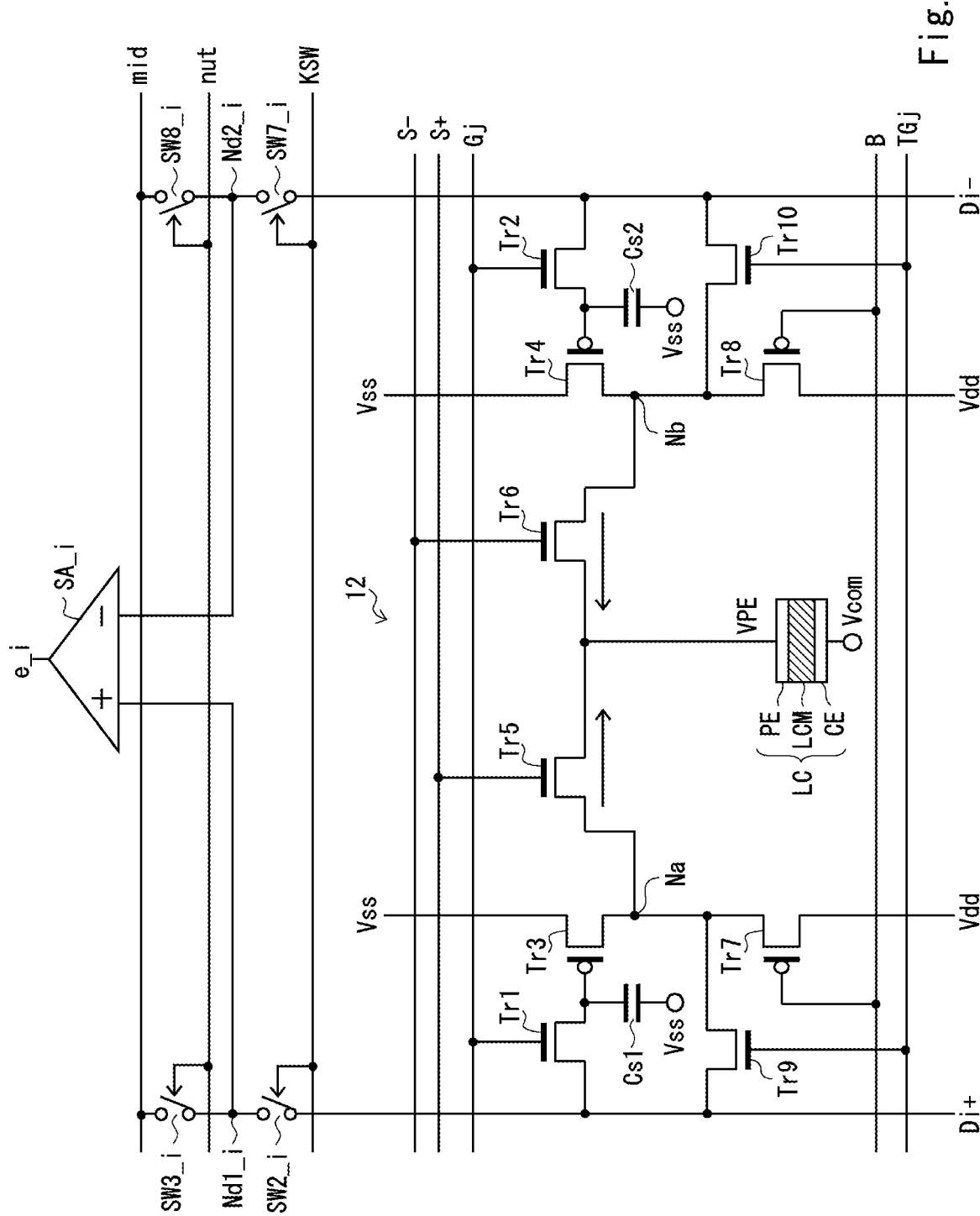
FIG. 8 is a diagram showing a specific configuration example of pixels and circuits provided near these pixels provided in the liquid crystal display apparatus shown in FIG. 7.

FIG. 8 is a diagram showing a specific configuration example of the pixel 12. In the example shown in FIG. 8, of the pixels 12 of n rows×m columns, the pixel 12 in the j-th row and the i-th column is shown.

Referring to FIG. 8, each pixel 12 is different from the pixel 52 in terms of the connection relation of the transistors (switch transistors) Tr9 and Tr10. In the pixel 12 in the j-th row and the i-th column, the transistor Tr9, which is provided between the node Na, which is the output node of the source follower buffer composed of the transistors Tr3 and Tr7, and the data line Di+, switches ON/OFF by a switch selection line for reading TGj. Further, the transistor Tr10, which is provided between the node Nb, which is the output node of the source follower buffer composed of the transistors Tr4 and Tr8, and the data line Di−, switches ON/OFF by the switch selection line for reading TGj. Since the other configurations of each of the pixels 12 are similar to those of the pixel 52, the descriptions thereof will be omitted.

The polarity changeover control circuit 14 outputs, based on a timing signal generated by the timing generator 13, a gate control signal for the positive polarity (gate control signal S+) to the gate control signal line S+, outputs a gate control signal for the negative polarity (gate control signal S−) to the gate control signal line S−, and further outputs a gate control signal (gate control signal B) to the gate control signal line B.

The vertical shift register and level shifter 15 outputs scan pulses of n rows from the first row to the n-th row, one row at a time, in series in a cycle of one horizontal scan period HST. The AND circuits ADA1 to ADAn respectively control, based on the mode switch signal MD externally supplied, whether or not to output the scan pulses of n rows sequentially output from the vertical shift register and level shifter 15 one row at a time to the row scan lines G1 to Gn. Further, the AND circuits ADB1 to ADBn respectively control, based on the mode switch signals MD and TMD externally supplied, whether or not to output the scan pulses of n rows sequentially output from the vertical shift register and level shifter 15 one row at a time to the switch selection lines for reading TG1 to TGn.

In the case of an operation in which the video signal is written into the pixel 12 (image writing operation), for example, the H level mode switch signal MD is externally supplied. In this case, the AND circuits ADA1 to ADAn respectively output the scan pulses of n rows sequentially output from the vertical shift register and level shifter 15 one row at a time to the row scan lines G1 to Gn. At this time, the AND circuits ADB1 to ADBn do not respectively output the scan pulses of n rows sequentially output from the vertical shift register and level shifter 15 one row at a time to the switch selection lines for reading TG1 to TGn. In this case, each of the switch selection lines for reading TG1 to TGn is fixed to the L level.

On the other hand, in an operation in which the video signal written in the pixel 12 is read out (image reading operation), an L level mode switch signal MD is externally supplied. In this case, when an H level mode switch signal TMD is externally supplied, the AND circuits ADB1 to ADBn respectively output the scan pulses of n rows sequentially output from the vertical shift register and level shifter 15 one row at a time to the switch selection lines for reading TG1 to TGn. At this time, the AND circuits ADA1 to ADAn do not respectively output the scan pulses of n rows sequentially output from the vertical shift register and level shifter 15 one row at a time to the row scan lines G1 to Gn. Therefore, each of the row scan lines G1 to Gn is fixed to the L level.

The switch unit 18 switches whether or not to output the voltages of m positive-polarity video signals read out from the m pixels 12 of the row to be inspected to the m respective data lines D1+ to Dm+ as the positive-polarity pixel drive voltages to nodes Nd1_1 to Nd1_m. Further, the switch unit 18 switches whether or not to output the voltages of m negative-polarity video signals read out from the m pixels 12 of the row to be inspected to the m respective data lines D1− to Dm− as negative-polarity pixel drive voltages to the nodes Nd2_1 to Nd2_m. Further, the switch unit 18 switches whether or not to output a predetermined voltage of a voltage supply line mid (predetermined voltage mid) to the m sets of data lines D1+, D1− to Dm+, and Dm−.

The sense amplifier unit 19 amplifies the respective potential differences between the voltages output from the m data lines D1+ to Dm+ to the nodes Nd1_1 to Nd1_m via the switch unit 18 and the voltages output from the m data lines D1− to Dm− to the nodes Nd2_1 to Nd2_m via the switch unit 18 and outputs amplification signals e_1 to e_m. The latch unit 20 latches the amplification signals e_1 to e_m output from the sense amplifier 19 and concurrently outputs the resulting signals.

Figure 9:
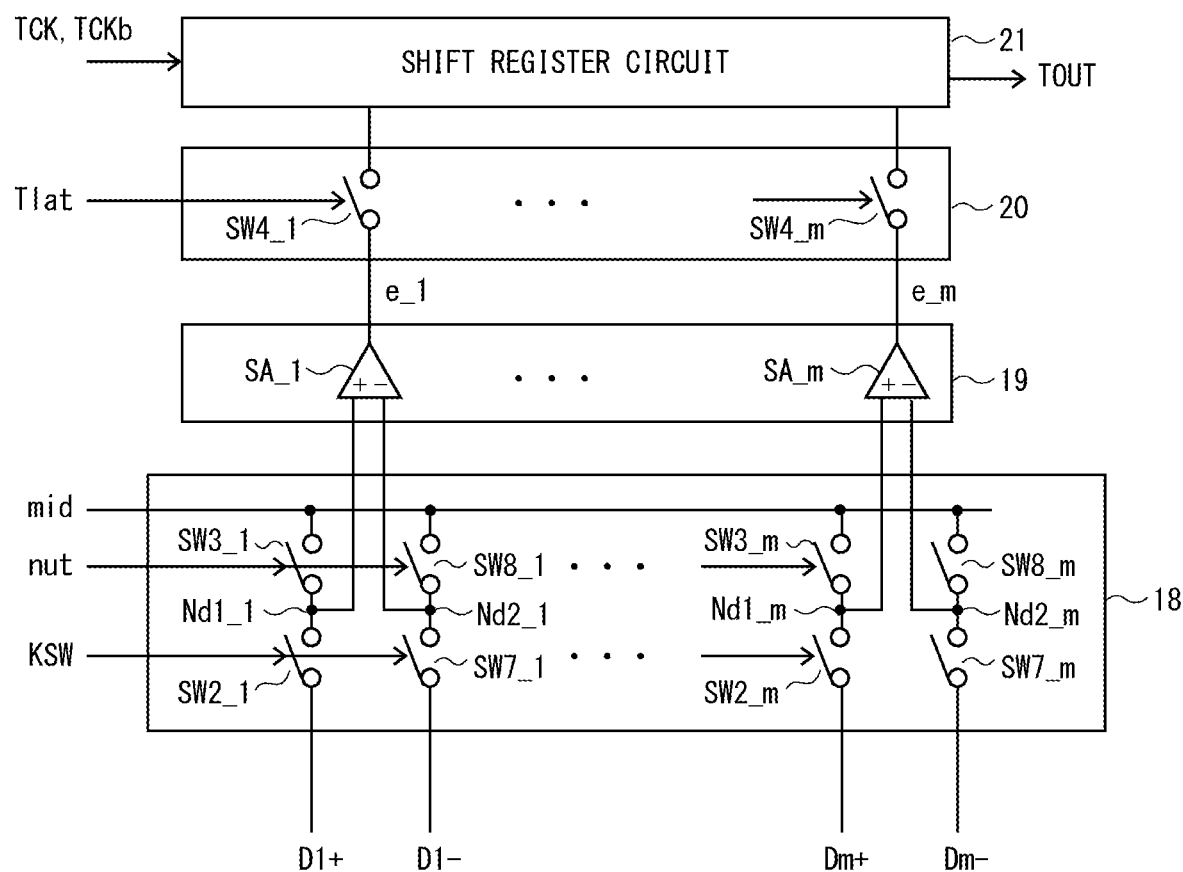
FIG. 9 is a diagram showing a switch unit 18, a sense amplifier unit 19, and a latch unit 20 provided in the liquid crystal display apparatus shown in FIG. 7 in more detail.

FIG. 9 is a diagram showing the switch unit 18, the sense amplifier unit 19, and the latch unit 20 provided in the liquid crystal display apparatus 1 in more detail. The switch unit 18 includes m switch elements SW2_1 to SW2_m, m switch elements SW3_1 to SW3_m, m switch elements SW7_1 to SW7_m, and m switch elements SW8_1 to SW8_m. The sense amplifier unit 19 includes m sense amplifiers SA_1 to SA_m. The latch unit 20 includes m switch elements SW4_1 to SW4_m.

In the switch unit 18, the switch elements SW2_1 to SW2_m are respectively provided between the data lines D1+ to Dm+ and the nodes Nd1_1 to Nd1_m, and its ON and OFF are switched by a switch signal KSW. The switch elements SW3_1 to SW3_m are respectively provided between the nodes Nd1_1 to Nd1_m and the voltage supply line mid, and its ON and OFF are switched by a switch signal nut. Further, the switch elements SW7_1 to SW7_m are respectively provided between the data lines D1− to Dm− and the nodes Nd2_1 to Nd2_m, and its ON and OFF are switched by the switch signal KSW. The switch elements SW8_1 to SW8_m are respectively provided between the nodes Nd2_1 to Nd2_m and the voltage supply line mid and its ON and OFF are switched by the switch signal nut.

In the sense amplifier unit 19, the sense amplifiers SA_1 to SA_m amplify the respective potential differences between the voltages of the nodes Nd1_1 to Nd1_m and the voltages of the nodes Nd2_1 to Nd2_m and output the amplification signals e_1 to e_m. In the latch unit 20, the switch elements SW4_1 to SW4_m are respectively provided on a signal line where the amplification signals e_1 to e_m are propagated, and its ON and OFF are switched by a trigger signal Tlat.

For example, by turning on the switch elements SW2_1 to SW2_m and the switch elements SW3_1 to SW3_m, the m data lines D1+ to Dm+ and the voltage supply line mid are short-circuited. Accordingly, the voltages of the m data lines D1+ to Dm+ are refreshed to a predetermined voltage mid. In a similar way, by turning on the switch elements SW7_1 to SW7_m and the switch elements SW8_1 to SW8_m, the m data lines D1− to Dm− and the voltage supply line mid are short-circuited. Accordingly, the voltages of the m data lines D1− to Dm− are refreshed to a predetermined voltage mid.

Further, for example, by turning on the switch elements SW2_1 to SW2_m and turning off the switch elements SW3_1 to SW3_m, the m positive pixel drive voltages read out from the m pixels 12 of the row to be inspected to the m respective data lines D1+ to Dm+ are output to the nodes Nd1_1 to Nd1_m. In a similar way, by turning on the switch elements SW7_1 to SW7_m and turning off the switch elements SW8_1 to SW8_m, the m negative pixel drive voltages read out from the m pixels 12 of the row to be inspected to the m respective data lines D1− to Dm− are output to the nodes Nd2_1 to Nd2_m. At this time, the sense amplifiers SA_1 to SA_m amplify the respective potential differences between the voltages of the nodes Nd1_1 to Nd1_m and the voltages of the nodes Nd2_1 to Nd2_m and output the amplification signals e_1 to e_m indicated by the H or L level. Then the switch elements SW4_1 to SW4_m provided in the latch unit 20 latch the amplification signals e_1 to e_m of the sense amplifiers SA_1 to SA_m and concurrently output the resulting signals.

(Specific Configuration Example of Sense Amplifier SA_i)

Figure 10:
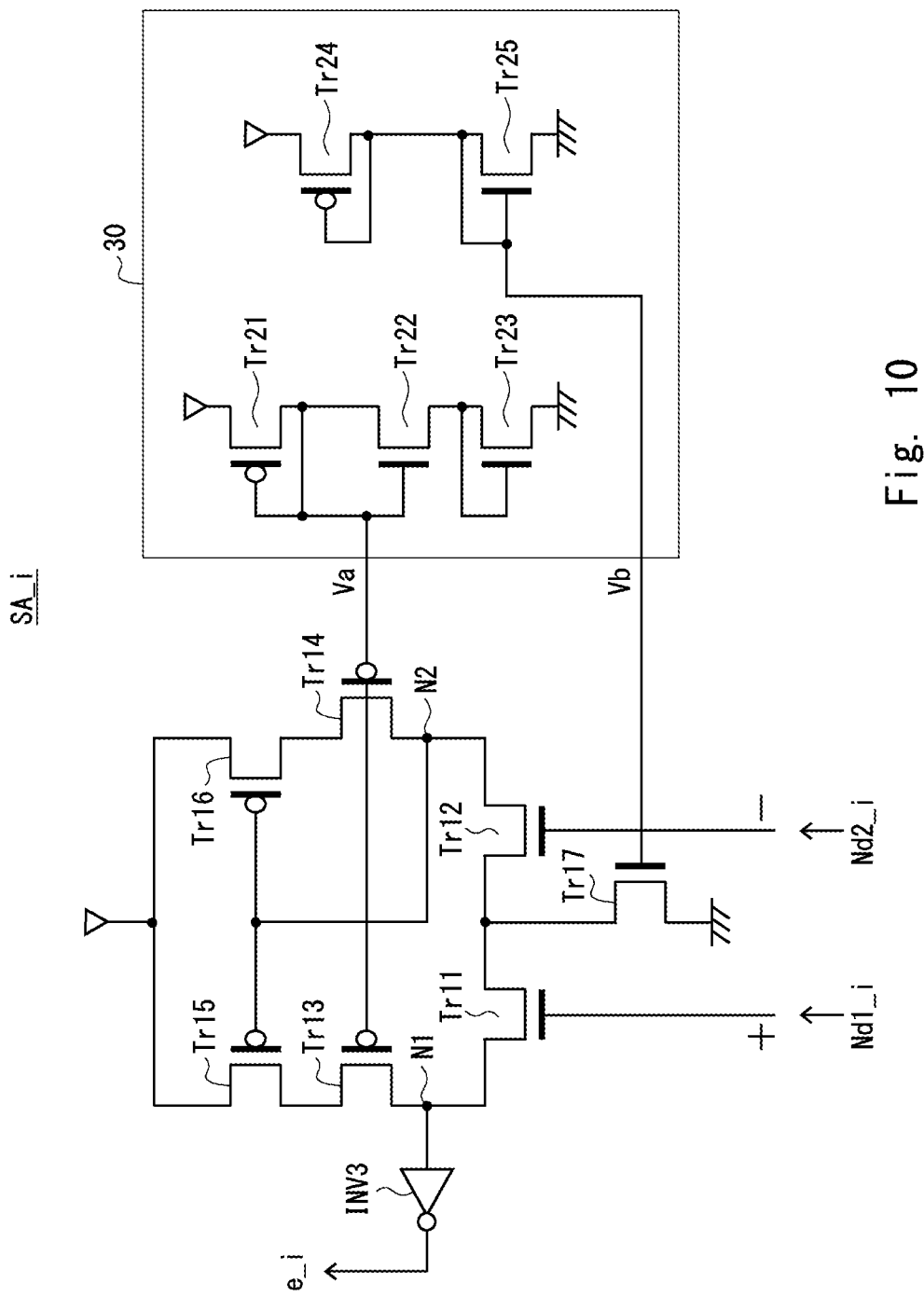
FIG. 10 is a diagram showing a specific configuration example of a sense amplifier SA_i provided in the liquid crystal display apparatus shown in FIG. 7.

FIG. 10 is a circuit diagram showing a specific configuration example of the sense amplifier SA_i. FIG. 10 also shows a voltage source circuit 30. As shown in FIG. 10, the sense amplifier SA_i includes transistors Tr11 to Tr17. The transistors Tr13 to Tr16 are both P-channel MOS transistors and the transistors Tr11, Tr12, and Tr17 are all N-channel MOS transistors. The voltage source circuit 30 includes transistors Tr21 to Tr25. The transistors Tr21 and Tr24 are P-channel MOS transistors and the transistors Tr22, Tr23, and Tr25 are N-channel MOS transistors.

The transistors Tr15 and Tr16 are provided in parallel between the power supply voltage terminal Vdd and the ground voltage terminal Vss and a voltage of the node N2 is applied to the gates of these transistors Tr15 and Tr16. The transistors Tr13 and Tr14 are provided in series with the transistors Tr15 and Tr16, respectively, and an output voltage Va of the voltage source circuit 30 is applied to the gates of these transistors Tr13 and Tr14. The transistors Tr11 and Tr12 are provided in series with the transistors Tr13 and Tr14, respectively, and a non-inverting input terminal to which the voltage of a node Nd1_i is supplied and an inverting input terminal to which the voltage of a node Nd2_i is supplied are connected to the respective gates of the transistors Tr11 and Tr12. The transistor Tr17 is provided between the transistors Tr11 and Tr12 and the ground voltage terminal Vss, and an output voltage Vb of the voltage source circuit 30 is applied to the gate of the transistor Tr17. The voltage of the node N1 between the transistors Tr11 and Tr13 is inverted by an inverter INV3 and then the obtained voltage is output as an amplification signal e_i.

In the voltage source circuit 30, the transistors Tr21 to Tr23 are both diode-connected and are provided in series between the power supply voltage terminal Vdd and the ground voltage terminal Vss. The gate voltages of the transistors Tr21 and Tr22 are output as the voltage Va of the voltage source circuit 30. The transistors Tr24 and Tr25 are both diode-connected and are provided in series between the power supply voltage terminal Vdd and the ground voltage terminal Vss. The gate voltage of the transistor Tr25 is output as the voltage Vb of the voltage source circuit 30.

Note that the configuration of the sense amplifier SA_i is not limited to the one shown in FIG. 10 and may be changed as appropriate to another configuration that can achieve similar functions and a configuration of a sense amplifier with a higher gain and a high performance.

The shift register circuit 21, which has a dynamic shift register configuration, receives the amplification signals e_1 to e_m concurrently output from the latch unit 20 and sequentially outputs them one by one in series as an inspection signal (detection signal) TOUT.

Figure 11:
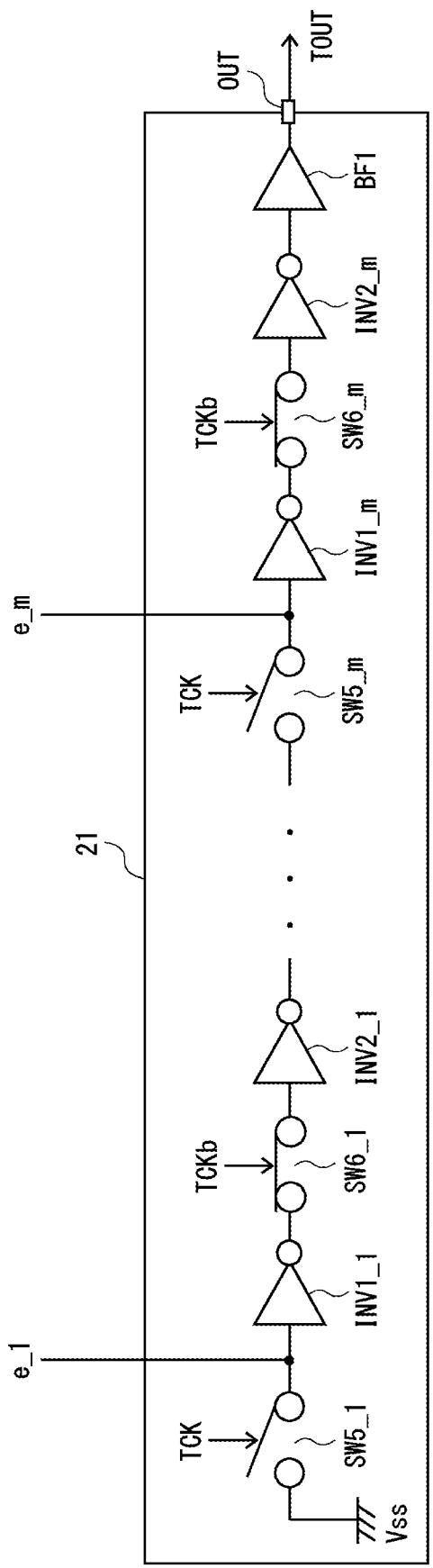
FIG. 11 is a diagram showing a specific configuration example of a shift register circuit 21 provided in the liquid crystal display apparatus shown in FIG. 7.

FIG. 11 is a diagram showing the shift register circuit 21 provided in the liquid crystal display apparatus 1 in more detail. The shift register circuit 21 includes inverters INV1_1 to INV1_m, inverters INV2_1 to INV2_m, switch elements SW5_1 to SW5_m, switch elements SW6_1 to SW6_m, and a buffer BF1.

In the shift register circuit 21, m sets of the switch element SW5_i, the inverter INV1_i, the switch element SW6_i, and the inverter INV2_i connected in series are provided in series between the ground voltage terminal Vss and the output terminal OUT. The buffer BF1 is provided in the stage subsequent to the inverter INV2_m. The amplification signals e_1 to e_m concurrently output from the latch unit 20 are respectively supplied to the output terminals of the inverters INV1_1 to INV1_m. Note that the switch elements SW5_1 to SW5_m switch ON and OFF by a clock signal TCK. Further, the switch elements SW6_1 to SW6_m switch ON and OFF complimentarily with the switch elements SW5_1 to SW5_m by a clock signal TCKb. The configuration of the shift register circuit 21 is not limited to the one shown in FIG. 11 and may be changed as appropriate to another configuration that can achieve similar functions.

(Operation of Liquid Crystal Display Apparatus 1 in Pixel Inspection Mode)

Next, an operation of the liquid crystal display apparatus 1 in the pixel inspection mode will be described.

Figure 12:
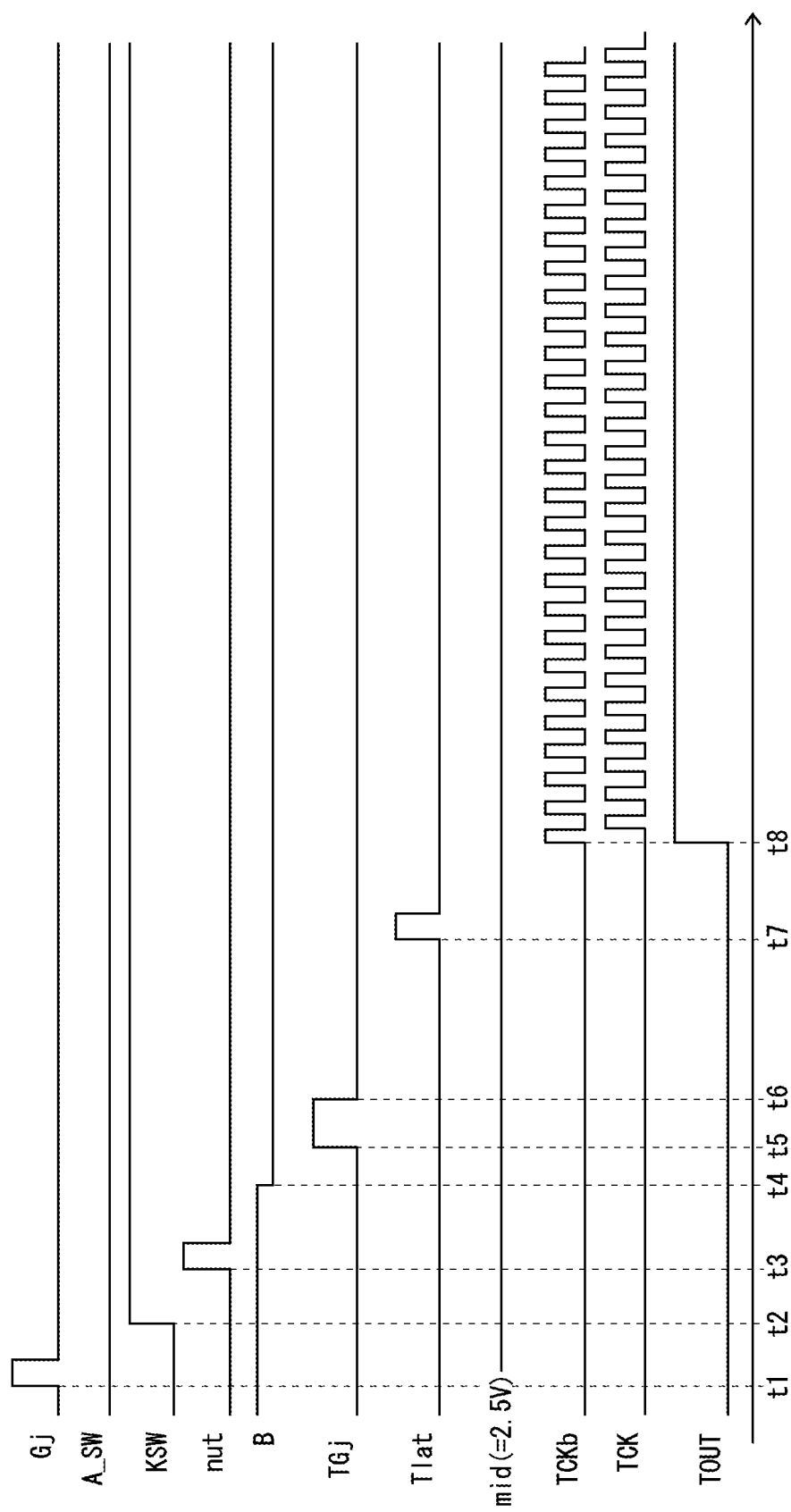
FIG. 12 is a timing chart showing an operation of the liquid crystal display apparatus shown in FIG. 7 in a pixel inspection mode.

As already described above, FIG. 8 is a diagram showing a configuration example of the pixels 12 and circuits provided near these pixels provided in the liquid crystal display apparatus 1. In the example shown in FIG. 8, of the pixels 12 of n rows×m columns, the pixel 12 in the j-th row and the i-th column and circuits provided near these pixels are shown. Further, FIG. 12 is a timing chart showing an operation of the liquid crystal display apparatus 1 in the pixel inspection mode.

In the pixel inspection mode, first, the video signal for inspection is written into the m pixels 12 in the j-th row to be inspected. The operation in this case is basically similar to the operation of writing the video signal in the image display mode. In this case, an H level mode switch signal MD is externally supplied. Accordingly, the scan pulse in the j-th row output from the vertical shift register and level shifter 15 is supplied to the row scan line Gj in the j-th row. Therefore, for example, the transistors Tr1 and Tr2 provided in each of the pixels 12 in the j-th row are temporarily turned on since the scan pulse is supplied to the row scan line Gj (time t1). As a result, the voltages of the corresponding positive-polarity and negative-polarity video signals are accumulated and held in the holding capacitors Cs1 and Cs2 provided in each of the pixels 12 in the j-th row. On the other hand, the transistors Tr9 and Tr10 provided in each of the pixels 12 maintain the OFF state.

Next, the video signal written into the m pixels 12 in the j-th row to be inspected is read out. At this time, the mode switch signal MD externally supplied is switched from the H level to the L level. Further, at this time, switch elements SW1+, SW1- to SWm+, and SWm- provided in the analog switch unit 17 are both turned off (the control signal A_SW that controls ON/OFF of each of the switch elements of the analog switch unit 17 is controlled to be inactive (L level)).

First, by making the switch signal KSW active (e.g., the H level), the switch elements SW2_1 to SW2_m and SW7_1 to SW7_m are switched from off to on (time t2). Accordingly, the respective non-inverting input terminals of the sense amplifiers SA_1 to SA_m and the data lines D1+ to Dm+ are made conductive and the respective inverting input terminals of the sense amplifiers SA_1 to SA_m and the data lines D1- to Dm- are made conductive.

After that, the switch signal nut is temporarily made active (e.g., the H level), whereby the switch elements SW3_1 to SW3_m and SW8_1 to SW8_m are temporarily turned on (time t3). Accordingly, the data lines D1+ to Dm+ and the voltage supply line mid are short-circuited, whereby the voltages of the data lines D1+ to Dm+ are refreshed to a predetermined voltage mid. Further, since the data lines D1- to Dm- and the voltage supply line mid are short-circuited, the voltages of the data lines D1- to Dm- are refreshed to a predetermined voltage mid.

Next, the positive-polarity video signal written into the holding capacitor Cs1 of the pixel 12 to be inspected is read out to the data line Di+ and the negative-polarity video signal written into the holding capacitor Cs2 of the pixel 12 to be inspected is read out to the data line Di-. At this time, an H level mode switch signal TMD is externally supplied.

First, the gate control signal B is made active (L level), whereby a positive-side source follower buffer composed of the transistors Tr3 and Tr7 of each of the pixels 12 and a negative-side source follower buffer composed of the transistors Tr4 and Tr8 are operated (time t4). Accordingly, the voltage of the positive-polarity video signal held in the holding capacitor Cs1 is charged in the node Na, which is the output node of the positive-side source follower buffer of each of the pixels 12. Further, the voltage of the negative-polarity video signal held in the holding capacitor Cs2 is charged in the node Nb, which is the output node of the negative-side source follower buffer of each of the pixels 12.

After that, the scan pulse in the j-th row output from the vertical shift register and level shifter 15 is supplied to the switch selection line for reading TGj in the j-th row (time t5).

Accordingly, the transistors Tr9 and Tr10 provided in each of the pixels 12 in the j-th row are temporarily turned on when the scan pulse is supplied to the switch selection line for reading TGj. Therefore, each of the node Na of m pixels 12 in the j-th row and the data lines D1+ to Dm+ is made conductive. As a result, the voltage of the positive-polarity video signal charged in the node Na of the m pixels 12 is read out to and held in each of the data lines D1+ to Dm+ as the positive-polarity pixel drive voltage. In a similar way, each of the node Nb of the m pixels 12 in the j-th row and the data lines D1- to Dm- is made conductive. As a result, the voltage of the negative-polarity video signal charged in the node Nb of these m pixels 12 is read out to and held in each of the data lines D1- to Dm- as the negative-polarity pixel drive voltage.

Since all the switches of the analog switch unit 17 are controlled to be turned off, the wiring capacity of the common wiring Dcom+ of about 5 pF is not added to the data line Di+, and only the wiring capacity of pixels 12 of n rows is added. In the case of FHD, for example, only the wiring capacity of about 1 pF for 1080 pixels is added to the data line Di+. Therefore, in the liquid crystal display apparatus 1, the source follower buffer (Tr3 and Tr7) provided in the pixel 12 in the j-th row and the i-th column to be inspected is not affected by the wiring capacity of the common wiring Dcom+. Therefore, it is sufficient that the capacity of about one sixth in terms of a capacity be driven compared to the case of the liquid crystal display apparatus 50. Further, this source follower buffer (Tr3 and Tr7) is not affected by the wiring resistance of the common wiring Dcom+. Therefore, it is possible to reduce the time until the node Na is stabilized to a level substantially equal to the voltage held in the holding capacitor Cs1 by the source follower buffer (Tr3 and Tr7) provided in the pixel 12 to be inspected.

In a similar way, since all the switches of the analog switch unit 17 are controlled to be turned off, the wiring capacity of about 5 pF of the common wiring Dcom- is not added to the data line Di- and only the wiring capacity of pixels 12 of n rows is added. In the case of FHD, for example, only the wiring capacity of about 1 pF for 1080 pixels is added to the data line Di-. Therefore, in the liquid crystal display apparatus 1, the source follower buffer (Tr4 and Tr8) provided in the pixel 12 in the j-th row and the i-th column to be inspected is not affected by the wiring capacity of the common wiring Dcom-. Therefore, it is sufficient that the capacity of about one sixth in terms of a capacity be driven compared to the case of the liquid crystal display apparatus 50. Further, this source follower buffer (Tr4 and Tr8) is not affected by the wiring resistance of the common wiring Dcom−. Therefore, it is possible to reduce the time until the node Nb is stabilized to a level substantially equal to the voltage held in the holding capacitor Cs2 by the source follower buffer (Tr4 and Tr8) provided in the pixel 12 to be inspected.

After that, the switch selection signal for reading TGj becomes inactive (L level). Accordingly, the transistors Tr9 and Tr10 are turned off (time t6).

The voltages of the m positive-polarity video signals (positive-polarity pixel drive voltages) read out to the respective data lines D1+ to Dm+ are supplied to the non-inverting input terminals of the sense amplifiers SA_1 to SA_m, respectively. The voltages of the m negative-polarity video signals (negative-polarity pixel drive voltages) read out to the respective data lines D1− to Dm− are supplied to the inverting input terminals of the sense amplifiers SA_1 to SA_m, respectively.

The sense amplifiers SA_1 to SA_m amplify the respective potential differences between the voltages of the m positive-polarity video signals read out from the m respective pixels 12 in the j-th row to the data lines D1+ to Dm+ and the voltages of the m negative-polarity video signals read out from the m respective pixels 12 in the j-th row to the data lines D1− to Dm−, and output the amplification signals e_1 to e_m indicated by the H level or the L level.

For example, when 2.6 V voltage of the positive-polarity video signal is read out to the data line Di+ and 2.4 V voltage of the negative-polarity video signal is read out to the data line Di− from the pixel 12 in the j-th row and the i-th column, the sense amplifier SA_i outputs the H level amplification signal e_i. On the other hand, when 2.4 V voltage of the positive-polarity video signal is read out to the data line Di+ and 2.6 V voltage of the negative-polarity video signal is read out to the data line Di− from the pixel 12 in the j-th row and the i-th column, the sense amplifier SA_i outputs the L level amplification signal e_i.

Then the switch elements SW4_1 to SW4_m provided in the latch unit 20 concurrently output amplification signals e_1 to e_m of the sense amplifiers SA_1 to SA_m at a timing when the trigger signal Tlat has temporarily become active (time t6).

After that, the shift register circuit 21 receives the amplification signals e_1 to e_m concurrently output from the latch unit 20 and outputs them as an inspection signal TOUT one by one in series (time t7).

An inspection apparatus (not shown) provided outside the liquid crystal display apparatus 1 compares the value of the inspection signal TOUT with the expected value, thereby detecting a failure (defects, deterioration in characteristics etc.) of the m pixels 12 in the j-th row to be inspected.

The above inspection is performed from the m pixels 12 in the first row to the m pixels 12 in the n-th row one by one in series.

As described above, the liquid crystal display apparatus 1 according to this embodiment includes, besides the path for writing the video signal into the pixel 12, the path for reading out the video signal from the pixel 12. Further, when the video signal written into the pixel 12 to be inspected is read out, a part of the path for writing the video signal into the pixel 12 is electrically separated from the data line. Accordingly, with the liquid crystal display apparatus 1 according to this embodiment, for example, it is not required to excessively charge the wiring capacities of the common wiring Dcom+ and Dcom− when the video signal written into the pixel 12 to be inspected is read out, whereby it is possible to reduce the time required to stabilize the pixel drive voltage VPE by the source follower buffer of each of the pixels 12, as a result of which the inspection of the pixels 12 by the inspection apparatus can be quickly executed.

Further, in the liquid crystal display apparatus 1 according to this embodiment, it is possible to inspect leakage of the charge accumulated in the holding capacitors Cs1 and Cs2 provided in each of the pixels 12.

Now, an N-type diffusion layer that forms the drain of the transistor Tr1 and a P-well form a PN junction. Therefore, if a defect occurs in the PN junction part during a manufacturing process, it is possible that the charge accumulated in the holding capacitor Cs1 may be leaked to the P-well via the PN junction part. This may cause the voltage of the holding capacitor Cs1 to be gradually decreased toward the ground voltage level. In a similar way, an N-type diffusion layer that forms the drain of the transistor Tr2 and the P-well form a PN junction. Therefore, if a defect occurs in the PN junction part during the manufacturing process, it is possible that the charge accumulated in the holding capacitor Cs2 may be leaked to the P-well via the PN junction part. This may cause the voltage of the holding capacitor Cs2 to be gradually decreased toward the ground voltage level. In this case, pixel defects may occur in an image displayed on a liquid display panel (a display screen of the image display unit 11).

In order to solve the above problem, in the liquid crystal display apparatus 1 according to this embodiment, when the leakage of the charge accumulated in the holding capacitors Cs1 and Cs2 provided in each of the pixels 12 is inspected, the time from when the positive-polarity video signal is written into the holding capacitor Cs1 of the pixel 12 to be inspected to the time when the video signal written into the holding capacitor Cs1 is read out is made longer than that in the case in which the normal inspection is performed. In a similar way, the time from when the negative-polarity video signal is written into the holding capacitor Cs2 of the pixel 12 to be inspected to the time when the video signal written into the holding capacitor Cs2 is read out is made longer than that in the case in which the normal inspection is performed.

According to the above configuration, when the charge in the holding capacitor Cs1 is leaked, the voltage held in the holding capacitor Cs1 decreases with time. Therefore, this decreased voltage is directly output as the positive-polarity pixel drive voltage by the source follower buffer (Tr3 and Tr7). In a similar way, when the charge in the holding capacitor Cs2 is leaked, the voltage held in the holding capacitor Cs2 decreases with time. Therefore, this decreased voltage is directly output as the negative-polarity pixel drive voltage by the source follower buffer (Tr4 and Tr8).

When the leakage of the charge in the holding capacitor Cs1 provided in the pixel 12 to be inspected is inspected, for example, the expected value of the positive-polarity pixel drive voltage read out from the holding capacitor Cs1 is set to 2.6 V and the expected value of the negative-polarity pixel drive voltage read out from the holding capacitor Cs2 is set to 2.5 V. Accordingly, when, for example, the charge in the holding capacitor Cs1 provided in the pixel 12 to be inspected is not leaked, the positive-polarity pixel drive voltage read out from this pixel 12 indicates 2.6 V, and therefore the output of the sense amplifier indicates the H level, which indicates that the pixel 12 to be inspected is normal. On the other hand, when the charge in the holding capacitor Cs1 of the pixel 12 to be inspected is leaked, the positive-polarity pixel drive voltage read out from this pixel 12 indicates a value (e.g., 2.4 V) lower than the expected value, and therefore the output of the sense amplifier indicates the L level, which indicates that the charge in the holding capacitor Cs1 provided in the pixel 12 to be inspected is leaked. After that, by repeating the fine adjustment and the inspection of the expected value of the positive-polarity pixel drive voltage, the leakage amount of the holding capacitor Cs1 can be specified.

In a similar way, when the leakage of the charge in the holding capacitor Cs2 provided in the pixel 12 to be inspected is inspected, for example, the expected value of the positive-polarity pixel drive voltage read out from the holding capacitor Cs1 is set to 2.5 V and the expected value of the negative-polarity pixel drive voltage read out from the holding capacitor Cs2 is set to 2.6 V. Accordingly, when, for example, the charge in the holding capacitor Cs2 provided in the pixel 12 to be inspected is not leaked, the negative-polarity pixel drive voltage read out from this pixel 12 indicates 2.6 V, and therefore the output of the sense amplifier indicates the L level, which indicates that the pixel 12 to be inspected is normal. On the other hand, when the charge in the holding capacitor Cs2 of the pixel 12 to be inspected is leaked, the negative-polarity pixel drive voltage read out from this pixel 12 indicates a value (e.g., 2.4 V) lower than the expected value, and therefore the output of the sense amplifier indicates the H level, which indicates that the charge in the holding capacitor Cs2 provided in the pixel 12 to be inspected is leaked. After that, by repeating the fine adjustment and the inspection of the expected value of the negative-polarity pixel drive voltage, the leakage amount of the holding capacitor Cs2 can be specified.

As described above, in the liquid crystal display apparatus 1, it is possible to inspect leakage of the holding capacitors Cs1 and Cs2 provided in each of the pixels 12.

When the leakage amount of the holding capacitors Cs1 and Cs2 and the place where the leakage has occurred can be specified, it is possible to correct the leakage amount thereof in the normal operation. According to this procedure, it is possible to correct chips that would otherwise have been discarded and use the corrected chips, whereby it is possible to improve the yield.

Further, since a PAD that has been added for the probe test (e.g., PAD to which signals TCK, TCKb, Tlat, nut, mid, KSW, and TOUT are externally supplied) is not used after the inspection, for example, this PAD is pulled down or pulled up to initialize and fix the pixel inspection circuit. Accordingly, even in a state in which the PAD that has been added for the probe test is floated since no signal voltage is externally input, the pixel inspection circuit is able to prevent the operation and the leakage current that are not intended.

As described above, the liquid crystal display apparatus 1 according to this embodiment is able to not only quickly inspect whether or not each of the transistors Tr1 to Tr4 and Tr7 to Tr10 and the holding capacitors Cs1 and Cs2 that compose the pixel 12 to be inspected is normally operated but also specify the leakage amount of each of the holding capacitors Cs1 and Cs2.

Further, in the liquid crystal display apparatus 1 according to this embodiment, the inspection on the positive side and the inspection on the negative side of the pixel 12 to be inspected can be concurrently performed, whereby it is possible to further increase the inspection speed compared to the case in which the inspection on the positive side and the inspection on the negative side are separately performed.

Further, the liquid crystal display apparatus 1 according to this embodiment performs both the operation of writing the video signal into the pixel 12 and the operation of reading the video signal from the pixel 12 in the pixel inspection mode. Therefore, it is possible to inspect not only the pixels 12 but also the circuits provided near these pixels to determine whether or not they are normally operated. It is needless to say that the pixel inspection method of the liquid crystal display apparatus 1 according to this embodiment may be used in combination with another inspection method.

The mechanism of the liquid crystal display apparatus 1 according to the first embodiment can also be applied, for example, to a spatial light modulator (SLM) mounted on a wavelength selection optical switch apparatus (WWS; Wavelength Selective Switch) used in the field of wavelength multiplexing optical communication. The spatial light modulator is composed using, for example, a Liquid Crystal on Silicon (LCOS) technique, deflects an optical signal that is made incident on an input port, and emits the deflected optical signal from one of one or more output ports that has been selected.

More specifically, the wavelength selection optical switch apparatus includes, for example, an input port, one or more output ports, a wavelength dispersion device, an optical coupler, and a spatial light modulator. The wavelength dispersion device spatially disperses the optical signal that is made incident on the input port to a plurality of wavelength components. The optical coupler focuses the plurality of wavelength components dispersed by the wavelength dispersion device. The spatial light modulator includes, for example, a plurality of pixels 12 arranged in a matrix on an xy-plane formed of an x-axis direction deployed in accordance with the wavelength and a y-axis direction that is vertical to the x-axis direction. The plurality of pixels 12 change (i.e., deflect) the reflection direction of the optical signal focused by the optical coupler for each wavelength and emit the obtained optical signal from one of one or more output ports that has been selected.

The wavelength selection optical switch apparatus is able to achieve effects similar to those achieved in the liquid crystal display apparatus 1 by applying the mechanism of the liquid crystal display apparatus 1 according to the first embodiment to the spatial light modulator.

According to this embodiment, it is possible to provide a liquid crystal device, a wavelength selection optical switch apparatus, and a pixel inspection method of the liquid crystal device capable of quickly executing inspection of pixels.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution

What is claimed is:
1. A liquid crystal device comprising:
a plurality of pixels arranged in a matrix;
a plurality of first data lines provided so as to correspond to respective columns of the plurality of pixels;
a plurality of second data lines provided so as to correspond to respective columns of the plurality of pixels;
a plurality of first switch elements configured to switch whether or not to supply a positive-polarity video signal to each of the plurality of first data lines and switch whether or not to supply a negative-polarity video signal to each of the plurality of second data lines; and a plurality of sense amplifiers configured to amplify potential differences between a plurality of positive-polarity pixel drive voltages read out from the plurality of pixels of a row to be inspected to the plurality of respective first data lines and a plurality of negative-polarity pixel drive voltages read out from the plurality of pixels of the row to be inspected to the plurality of respective second data lines and output resulting voltages as a plurality of detection signals, wherein each of the pixels comprises:

a first sample and hold circuit configured to sample and hold the positive-polarity video signal supplied to the corresponding first data line;

a second sample and hold circuit configured to sample and hold the negative-polarity video signal supplied to the corresponding second data line;

a liquid crystal display element including a pixel drive electrode, a common electrode, and liquid crystal sealed therebetween;

a polarity changeover switch configured to selectively apply the voltage of the positive-polarity video signal held by the first sample and hold circuit and the voltage of the negative-polarity video signal held by the second sample and hold circuit to the pixel drive electrode;

a first switch transistor configured to switch whether or not to output the voltage of the positive-polarity video signal that has been output from the first sample and hold circuit and has not been applied to the pixel drive electrode via the polarity changeover switch to the corresponding first data line as the positive-polarity pixel drive voltage; and a second switch transistor configured to switch whether or not to output the voltage of the negative-polarity video signal that has been output from the second sample and hold circuit and has not been applied to the pixel drive electrode via the polarity changeover switch to the corresponding second data line as the negative-polarity pixel drive voltage.

2. The liquid crystal device according to claim 1, further comprising:

a first source follower buffer configured to output the voltage of the positive-polarity video signal held by the first sample and hold circuit; and a second source follower buffer configured to output the voltage of the negative-polarity video signal held by the second sample and hold circuit, wherein the polarity changeover switch is configured to selectively apply respective output voltages of the first and second source follower buffers to the pixel drive electrode, the first switch transistor is provided between an output node of the first source follower buffer and the corresponding first data line, and the second switch transistor is provided between an output node of the second source follower buffer and the corresponding second data line.

3. The liquid crystal device according to claim 1, further comprising:

a plurality of second switch elements configured to supply a predetermined voltage to each of the plurality of first data lines before the plurality of positive-polarity pixel drive voltages are read out from the plurality of pixels of the row to be inspected to the plurality of respective first data lines; and a plurality of third switch elements configured to supply the predetermined voltage to each of the plurality of second data lines before the plurality of negative-polarity pixel drive voltages are read out from the plurality of pixels of the row to be inspected to the plurality of respective second data lines.

4. The liquid crystal device according to claim 1, further comprising a driver configured to turn on the plurality of first switch elements and turn off the first and second switch transistors provided in each of the pixels when the video signal is written and to selectively turn on the first and second switch transistors provided in each of the pixels of the row to be inspected in a state in which the plurality of first switch elements are turned off when the video signal is read out.

5. A wavelength selection optical switch apparatus comprising:

an input port;

one or more output ports; and a spatial light modulator composed of the liquid crystal device according to claim 1 including a plurality of pixels, the spatial light modulator deflecting an optical signal that is made incident on the input port and emitting the deflected optical signal from one of the one or more output ports that has been selected.

6. A pixel inspection method of a liquid crystal device comprising:

a plurality of pixels arranged in a matrix;

a plurality of first data lines provided so as to correspond to respective columns of the plurality of pixels;

a plurality of second data lines provided so as to correspond to respective columns of the plurality of pixels;

a plurality of first switch elements configured to switch whether or not to supply a positive-polarity video signal to each of the plurality of first data lines and switch whether or not to supply a negative-polarity video signal to each of the plurality of second data lines; and a plurality of sense amplifiers configured to amplify potential differences between a plurality of positive-polarity pixel drive voltages read out from the plurality of pixels of a row to be inspected to the plurality of respective first data lines and a plurality of negative-polarity pixel drive voltages read out from the plurality of pixels of the row to be inspected to the plurality of respective second data lines and output resulting voltages as a plurality of detection signals, wherein each of the pixels comprises:

a first sample and hold circuit configured to sample and hold the positive-polarity video signal supplied to the corresponding first data line;

a second sample and hold circuit configured to sample and hold the negative-polarity video signal supplied to the corresponding second data line;

a liquid crystal display element including a pixel drive electrode, a common electrode, and liquid crystal sealed therebetween;

a polarity changeover switch configured to selectively apply the voltage of the positive-polarity video signal held by the first sample and hold circuit and the voltage of the negative-polarity video signal held by the second sample and hold circuit to the pixel drive electrode;

a first switch transistor configured to switch whether or not to output the voltage of the positive-polarity video signal that has been output from the first sample and hold circuit and has not been applied to the pixel drive electrode via the polarity changeover switch to the corresponding first data line as the positive-polarity pixel drive voltage; and a second switch transistor configured to switch whether or not to output the voltage of the negative-polarity video signal that has been output from the second sample and hold circuit and has not been applied to the pixel drive electrode via the polarity changeover switch to the corresponding second data line as the negative-polarity pixel drive voltage, and the method comprises:
- turning on the plurality of first switch elements in a state in which the first and second switch transistors provided in each of the pixels is turned off, thereby supplying the positive-polarity video signal to each of the plurality of first data lines and supplying the negative-polarity video signal to each of the plurality of second data lines;
- writing the positive-polarity video signal from the plurality of respective first data lines to the plurality of pixels of the row to be inspected and writing the negative-polarity video signal from the plurality of respective second data lines to the plurality of pixels of the row to be inspected;
- turning on the first switch transistor provided in each of the pixels of the row to be inspected in a state in which the plurality of first switch elements are turned off, thereby reading out the plurality of positive-polarity pixel drive voltages from the plurality of pixels of the row to be inspected to the plurality of respective first data lines;
- turning on the second switch transistor provided in each of the pixels of the row to be inspected in a state in which the plurality of first switch elements are turned off, thereby reading out the plurality of negative-polarity pixel drive voltages from the plurality of pixels of the row to be inspected to the plurality of respective second data lines;
- amplifying the respective potential differences between the plurality of positive-polarity pixel drive voltages read out from the plurality of pixels of the row to be inspected to the plurality of respective first data lines and the plurality of negative-polarity pixel drive voltages read out from the plurality of pixels of the row to be inspected to the plurality of respective second data lines using the plurality of sense amplifiers and outputting resulting voltages as a plurality of detection signals; and
- detecting whether or not there is a failure in the plurality of pixels of the row to be inspected based on the plurality of detection signals output from the plurality of respective sense amplifiers.

7. The pixel inspection method of the liquid crystal device according to claim 6, wherein the liquid crystal device further comprises:
- a plurality of second switch elements configured to switch whether or not to supply a predetermined voltage to each of the plurality of first data lines; and
- a plurality of third switch elements configured to switch whether or not to supply the predetermined voltage to each of the plurality of second data lines, and the pixel inspection method further comprises:
- turning on the plurality of second switch elements before the plurality of positive-polarity pixel drive voltages are read out from the plurality of pixels of a row to be inspected to the plurality of respective first data lines, thereby supplying the predetermined voltage to each of the plurality of first data lines;
- turning on the plurality of third switch elements before the plurality of negative-polarity pixel drive voltages are read out from the plurality of pixels of the row to be inspected to the plurality of respective second data lines, thereby supplying the predetermined voltage to each of the plurality of second data lines;
- turning on the first switch transistor provided in each of the pixels of the row to be inspected in a state in which the plurality of second switch elements are turned off and the plurality of third switch elements are turned off in addition to a state in which the plurality of first switch elements are turned off, thereby reading out the plurality of positive-polarity pixel drive voltages from the plurality of pixels of the row to be inspected to the plurality of respective first data lines; and
- turning on the second switch transistor provided in each of the pixels of the row to be inspected in a state in which the plurality of second switch elements are turned off and the plurality of third switch elements are turned off in addition to a state in which the plurality of first switch elements are turned off, thereby reading out the plurality of negative-polarity pixel drive voltages from the plurality of pixels of the row to be inspected to the plurality of respective second data lines.

\* \* \* \* \*